(12) United States Patent  (10) Patent No.: US 7,881,418 B2
Ishii  (45) Date of Patent: Feb. 1, 2011

(54) DEVICE, METHOD AND PROGRAM FOR DETECTING COMMUNICATION FRAME BASE POINT THROUGH BLIND PROCESSING

(75) Inventor: Hiroyuki Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 1055 days.

(21) Appl. No.: 11/610,614

(22) Filed: Dec. 14, 2006

(65) Prior Publication Data

US 2008/0144757 A1   Jun. 19, 2008

(51) Int. Cl.
 *H04L 7/04* (2006.01)
(52) U.S. Cl. .................. 375/362; 375/260; 375/267; 375/342; 375/359; 375/360; 370/332
(58) Field of Classification Search ......... 375/135–137, 375/219–222, 295, 306, 316, 342–343, 359, 375/360, 362, 371, 259, 260, 267, 344
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 7,623,582 | B2 * | 11/2009 | Kim et al. | 375/260 |
| 7,746,963 | B2 * | 6/2010 | Chung et al. | 375/344 |
| 2006/0078040 | A1 * | 4/2006 | Sung et al. | 375/140 |
| 2007/0110174 | A1 * | 5/2007 | Glazko et al. | 375/260 |
| 2007/0183368 | A1 * | 8/2007 | Stavinov | 370/332 |
| 2008/0062043 | A1 * | 3/2008 | Gezici et al. | 342/387 |
| 2008/0317182 | A1 * | 12/2008 | Zhang et al. | 375/355 |
| 2009/0092197 | A1 * | 4/2009 | Okamoto et al. | 375/260 |

FOREIGN PATENT DOCUMENTS

| | | |
|---|---|---|
| JP | 11-252038 A | 9/1999 |
| JP | 11-252038 A | 9/1999 |
| JP | 2003-69546 A | 3/2003 |
| JP | 2003-69546 A | 3/2003 |
| JP | 004-135247 A | 4/2004 |
| JP | 004-135247 A | 4/2004 |

OTHER PUBLICATIONS

Seiichi Sanpei; "Digital Wireless Transmission Technology"; Published by Pearson Education Japan, Chapter 7. Published: Sep. 1, 2002.

* cited by examiner

*Primary Examiner*—Shuwang Liu
*Assistant Examiner*—Hirdepal Singh
(74) *Attorney, Agent, or Firm*—Dickstein Shapiro LLP

(57) ABSTRACT

A base point of a communication frame is detected by only using a reception signal, and an offset amount from the base point and the like are estimated. A device includes: an extraction unit for extracting self correlation processing signals from a digital communication signal having a signal frame for synchronization by using a pair of correlation processing windows of a variable size; a correlation unit for performing self correlation processing to the self correlation processing signals extracted; a matching unit for performing pattern matching processing between the correlation-processed signal, obtained through the self correlation processing, and a reference signal; and a computation unit for estimating the base point of the signal frame and an offset of the digital communication signal with respect to the base point, based on distance information of the pattern matching processing.

4 Claims, 21 Drawing Sheets

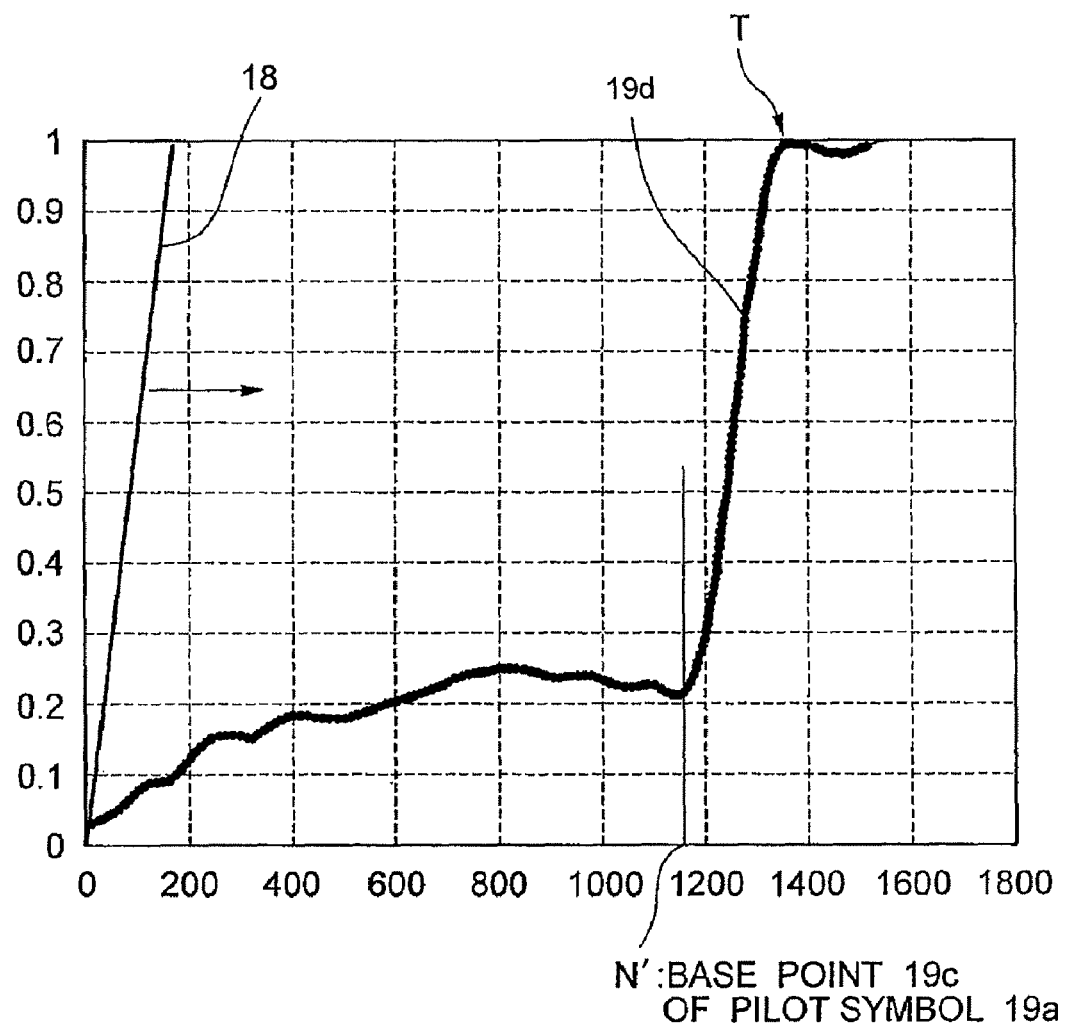

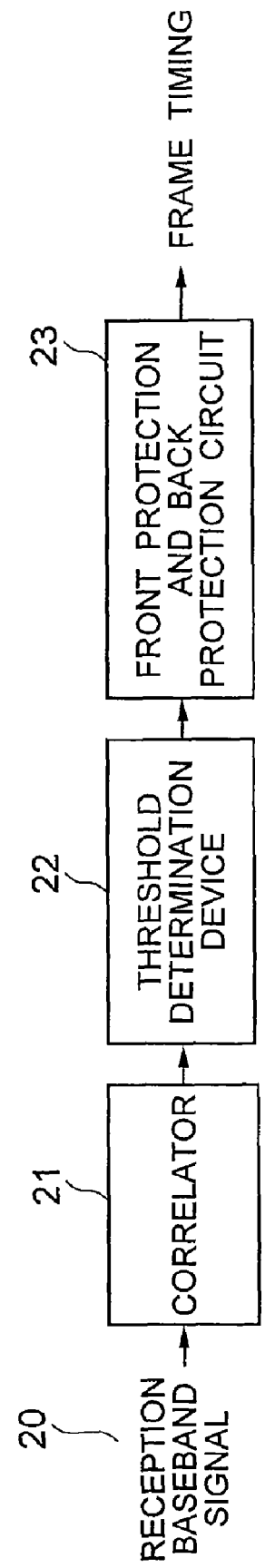

DEVICE, METHOD AND PROGRAM FOR DETECTING COMMUNICATION FRAME BASE POINT THROUGH BLIND PROCESSING

BACKGROUND OF THE INVENTION

1. Field of the Invention

The present invention relates to a device, a method and a program for detecting a communication frame base point through blind processing. In particular, the present invention relates to a device, a method and a program enabling to detect the base point of a communication frame, to estimate an offset amount from the base point of a communication frame and the like, without a synchronization pattern.

2. Description of Background Art

In a general digital wireless communication system, communication processing is performed by adding a pilot frame, having a synchronization pattern for synchronization processing, to the head of a data frame containing data to be transmitted. If a pilot frame having a synchronization pattern of the communication counterpart is known, it is possible to easily detect the starting base point of the communication frame by sharing the synchronization pattern with each other.

On the other hand, if a pilot frame having a synchronization pattern of the communication counterpart is not known, that is, in a radio wave monitoring system intended for illegal radio wave for example, subject signals are in a wide range, so the synchronization patterns must be provided corresponding to all illegal radio waves, respectively. However, when taking into account a fact the radio wave of the communication counterpart is an illegal radio wave, it is not practical that the radio wave monitoring system reserves countless synchronization patterns in advance.

Further, in an adaptive communication system in which the communication quality is improved by changing the structure of a communication frame corresponding to the quality of a communication path, the communication frame structure for synchronization processing may be changed. Therefore, processing to detect the base point of a communication system and to estimate the offset amount through blind processing is important.

Conventionally, in a processing method for a communication frame of this type, a unique pilot signal is added to a data frame of a communication frame as described above. Further, as a method of detecting a communication frame in a mobile communication system, "Digital Wireless Transmission Technology" by Seiichi Sanpei, Published by Pearson Education Japan (Non-Patent Document 1), Chapter 7 describes that detection of the base point of a communication frame is performed through correlation processing with respect to a known pilot symbol pattern. Referring to Non-Patent Document 1, explanation will be further given by using TDMA (Time Division Multiplexing Access) system as an example.

As obvious from the frame and slot configurations in the 6-channel TDMA system shown in FIGS. 7 and 6 of Non-Patent Document 1, unique words for synchronization processing are added to the head of each channel data, as shown in FIG. 20. In the case of Non-Patent Document 1, the unique words include a carrier phase sync word (CRSW), a symbol timing sync word (STSW), and a slot timing sync word (SLSW). These words have unique data patterns, and are added to each channel individually.

In Non-Patent Document 1, detection processing of frame synchronization is performed such that with respect to a reception database signal 20, correlation between a reception signal and the slot timing sync word which is a known pattern is first calculated by using a correlator 21, as shown in FIG. 21 (FIGS. 7 and 10 of Non-Patent Document 1). If the reception database signal 20 is true frame timing, a correlation peak is caused in the correlation processing by the correlator 21. On the other hand, if the reception database signal 20 is false frame timing, a correlation peak will not be caused in the correlation processing by the correlator 21. That is, processing to detect the base point of a communication frame is performed based on the correlation peak obtained.

Further, in order to prevent performance deterioration due to false correlation peaks, some false correlation peaks are excluded by using a threshold determination device 22. Then, by using a front protection and back protection circuit 23, false correlation peaks caused randomly are removed, and processing of synchronization point of a communication frame is performed.

Detecting a synchronization point of a communication frame by using the unique words mentioned above is same in the case of CDMA (Code Division Multiplexing Access) system.

Next, explanation will be given for a broadcasting system as an example. Broadcast signals are always transmitted continuously. Since the receiving side starts reception at any time, a pilot symbol for synchronization is indispensable in order to know the starting point of a communication frame. Even for the broadcast signals, processing to detect the base point of a communication frame is realized through correlation processing by using known unique words on the receiving side, like the above-described method.

As described above, in the communication processing according to the conventional example, processing to detect the base point of a communication frame is performed such that unique words applied to a subject reception signal are grasped in advance and processed on the receiving side.

In the method of detecting the base point of a communication frame according to the conventional example described above, a synchronization pattern for detecting the base point of a communication frame must be obtained in advance on the receiving side in order to detect the based point of the communication frame. Therefore, it is impossible to apply to a radio wave monitoring device intended for unspecified number of communication waves, and an adaptive communication system in which a communication frames are changed corresponding to the radio wave environment.

SUMMARY OF THE INVENTION

It is an object of the present invention to provide a device, a method and a program for detecting the base point of a communication frame, and to estimate the offset amount from the base point by only using a reception signal.

In order to achieve the object, the device for detecting the base point of a communication frame through blind processing, according to the present invention, performs processing to detect the base point of a communication frame and to estimate the offset amount of a receiving point of a reception signal with respect to the base point of the communication frame, by utilizing a characteristic that symbols for synchronization are arranged periodically to a communication frame, as the basic configuration thereof.

Next, the present invention will be described specifically by using a simulation result, taking the communication frame structure of a mode shown in FIGS. 3A and 3B as an example. The communication frame structure shown in FIG. 3A is so formed that a synchronization symbol (hereinafter referred to as a pilot symbol) 19a is added to the head of a communication frame (hereinafter referred to as a data frame), and the data frame 19b continues in the latter stage of the pilot symbol 19a, as the basic structure, and such signal structure is arranged continuously. Although explanation will be given for the case of a pilot symbol as a synchronization symbol, it may be one other than a pilot symbol. That is, anything is acceptable if it is given to the head of the communication frame in order to take synchronization with a reception signal.

It is assumed that reception of a reception signal, having a communication frame of the signal structure shown in FIG. 3A, is started from a point A (reception starting point) of the data frame 19b. First, to a reception signal that reception has been started, a pair of correlation processing windows 30a and 30b having a distance corresponding to the distance Nf between the adjacent pilot symbols 19a and 19a shown in FIG. 3B are prepared, and while expanding the size of the correlation processing windows 30a and 30b, self correlation processing signals are extracted, and correlation processing is performed to the self correlation processing signals extracted from the respective correlation processing windows 30a and 30b.

As shown in FIG. 3B, assuming that the basic size $W_1$ of the correlation processing windows 30a and 30b is '1', a size $W_2$ of the correlation processing windows 30a and 30b is set to two times as large as the basic size $W_1$, and the maximum size $W_{Nf}$ of the correlation processing windows 30a and 30b is set to Nf times as large as the basic size $W_1$. The dimension of the maximum size $W_{Nf}$ of the correlation processing windows 30a and 30b is set to a length corresponding to the distance Nf between the adjacent pilot symbols 19a and 19a.

When correlation processing is performed for the self correlation processing signals extracted from the reception signal by using the correlation processing windows 30a and 30b, a correlated signal T having a characteristic property at a part coinciding with the pilot symbol 19a is detected as shown in FIG. 4. The correlated signal T is detected due to the following phenomenon.

That is, pilot symbols adjacent to each other have the same data series pattern, but the data frames 19b continued from the pilot symbols have a completely random series pattern. Therefore, when the self correlation processing signals extracted from the pilot symbols 19a by using the correlation processing windows 30a and 30b are correlation-processed, an intense correlation result is obtained at the part coinciding with the pilot symbol 19a. As shown in FIG. 4, the correlated signal T, which is the intense correlation result, raises abruptly from the part coinciding with the pilot symbol 19a, that is, from the base point 19c of the pilot symbol 19a.

In the present invention, processing to which a pattern matching method is applied is performed in order to estimate the base point 19c of the pilot symbol 19a shown in FIG. 4. More specifically, pattern matching is performed between a reference signal 18 corresponding to a tilt component 19d of the correlated signal T raising abruptly shown in FIG. 4, and the correlated signal T, while shifting the reference signal 18 from the left end of the correlation-processed data to the correlated signal T side, to thereby calculate the distance between the respective points of the reference signal 18 and the correlated signal T. The processing described above is performed for each size of the correlation processing windows 30a and 30b sequentially, and the correlation-processed data (correlated data) is accumulated and stored.

Assuming that distance information of the accumulated correlated data is $R_n$ (n=1~Nf) and distance information of the reference signal 18 is $S_m$ (m=1~M), the distance data $\Delta d_t$ between respective points of the reference signal 18 and the correlated signal T obtained through pattern matching is expressed by the following equation (1). The distance is calculated based on the equation (1).

$$\Delta d_t = \sum_{t=1}^{N}\left(\sum_{m=1}^{M}(R_{m+1}-S_m)^2\right) \quad (1)$$

Note that N and M are integers, and M<N.

Through the pattern matching processing, the distance data $\Delta d_t$ corresponding to the number of data of the correlated signal T in which the reference signal 18 is shifted is created.

The base point 19c of the pilot symbol 19a shown in FIG. 4 corresponds to a shift point where the distance between the reference signal 18 and the correlated signal T becomes the shortest. Therefore, based on the distance data created, the shift point where the distance becomes the shortest is estimated as the base point 10a of the pilot symbol 19a.

Further, the offset amount ($\Delta N$) from the receiving point A in the data frame 19b to the base point 19c of the pilot symbol 19a shown in FIG. 3 is expressed by the following equation (2), where the estimated position of the base point 19c of the pilot symbol 19a is N'.

$$\Delta N = Nf - N' \quad (2)$$

Therefore, the offset amount ($\Delta N$) is calculated by assigning positional information of the estimated base point 19c of the pilot symbol 19a to the equation (2). Through the processing described above, it is possible to estimate the base point 19c of the pilot symbol 19a and the offset amount ($\Delta N$) of the receiving point A of the reception signal with respect to the base point 19c, based on the reception signal.

Next, explanation will be given for a case where reception of a reception signal is started from a receiving point B in the pilot symbol 19a shown in FIG. 3A, different from the receiving point A. Same as those described above, from the time of receiving the reception signal, the pair of correlation processing windows 30a and 30b having a distance corresponding to the distance Nf between the adjacent pilot symbols 19a and 19a are created, and correlation processing is performed in the same manner while changing the size W of the windows 30a and 30b, whereby the result shown in FIG. 5 is obtained. In the case of performing processing to estimate the base point 19c of the pilot symbol 19a through the pattern matching processing based on the correlation processing result shown in FIG. 5, the correlated signals T and T having a characteristic property, coinciding with the pilot symbol 19a, appear such that they are divided into two, that is, front and back, in the area of the pilot symbol. Therefore, it is impossible to estimate the base point 19c of the pilot symbol 19a accurately.

In order to solve the problem described above, the present invention is characterized as to perform processing to detect a normal correlated signal T through differential detection processing. The signal structure of the pilot symbol 19a and the data frame 19b is allocated corresponding to a communication channel, so the differential detection processing performs differential processing to the correlated data, which was correlation-processed, with correlated data of the adjacent communication channel. That is, assuming that the accumulated correlated data in one of the adjacent channels is $R_n$ (n=1~Nf) and the accumulated correlated data in the other one of the adjacent channels is $R_{n+1}$ (n+1=1~Nf), the differential result $P_n$ is expressed by the following equation (3).

$$Pn = |(R_{n+1} - R_n)| \quad (3)$$

Through the processing described above, a tilt component of the correlated signal T based on the correlated data, which was correlation processed, is extracted. Since the part coinciding with the pilot symbol of the correlated data increases linearly, a signal component having a waveform as shown in FIG. 6 with the top H in the vicinity of the center of the increment $T_0$ is obtained based on the differential result $P_n$.

Therefore, in the present invention, processing to detect the top H in the vicinity of the center of the increment $T_0$ forming the peak point, to calculate the distance $N_0$ between the peak point and the position at a half of the maximum size in the correlation processing result data, and to shift the correlated data into a range where shift estimation processing by pattern matching is possible, is performed. That is, the distance $N_0$ between the peak point and the position at a half of the maximum size Nf in the correlated data is calculated, and the receiving point B is shifted by the calculated distance $N_0$ in the pilot symbol 19a. Then, while changing the size W of the correlation processing windows 30a and 30b again, correlation processing is performed to the self correlation processing signals extracted by using the correlation processing windows 30a and 30b. FIG. 7 shows a signal waveform obtained from correlated data shifted and correlation-processed as described above.

As obvious from comparison between FIGS. 6 and 7, it is found that the part coinciding with the pilot symbol 19a is shifted to the almost center position of the signal waveform by the correlated data shown in FIG. 6 and raised as a normal correlated signal T as shown in FIG. 7, and through pattern matching processing between the reference signal 18 and the correlated signal T, the base point 19c of the pilot symbol 19a can be estimated.

The raising point of the correlated signal T described in FIG. 7 coincides with the position of the base point 19c of the pilot symbol 19a. Assuming that the position of the estimated base point 19c of the pilot symbol 19a is N', and the distance between the peak point and the position at a half of the maximum size $W_{Nf}$ (=Nf) of the correlation processing windows 30a and 30b is $N_0$, the offset amount ΔN of the receiving point B of the reception signal with respect to the base point 19c of the pilot symbol 19a is calculated from the following equation (4).

$$\Delta N = Nf - (N' + N_0) \quad (4)$$

Through the processing described above, it is possible to estimate the base point 19c of the pilot symbol 19a in the case of shifting the receiving point B of the reception signal by the distance data $\Delta d_f$, and the offset amount ΔN of the receiving point B of the reception signal with respect to the base point 19c.

Effects of the Invention

As described above, according to the present invention, and self correlation processing signals are extracted from the digital communication signal by using correlation processing windows of a variable size by utilizing a characteristic that a communication frame having a synchronization symbol is inserted periodically into a digital communication signal, and through pattern matching processing between the correlated signal obtained by correlation-processing the self correlated signals and the reference signal, communication parameters (such as the base point of a pilot symbol) are estimated. Therefore, it is possible to estimate communication parameters from the received digital communication signal without obtaining information about a known synchronization symbol in advance. Further, through differential detection processing, it is possible to estimate communication parameters from the received digital communication signal irrespective of a receiving point at which the digital communication signal is received.

Therefore, in a radio wave monitoring device intended for unspecified number of communication waves and an adaptive communication system in which the structure of a communication frame is changed corresponding to the radio wave environment, it is possible to estimate communication parameters from the received digital communication signal without obtaining information about the known synchronization symbol in advance.

BRIEF DESCRIPTION OF THE DRAWINGS

FIG. 4 is a characteristic chart showing a correlation processing result in the case where a reception signal is received in a data frame area;

FIG. 21 is a block diagram showing the configuration of a conventional example.

DESCRIPTION OF PREFERRED EMBODIMENTS

Hereinafter, embodiments of the present invention will be described in detail based on the drawings.

As the basic configuration, an embodiment according to the present invention performs processing to temporarily store data to be used for estimation processing to a digital communication signal having a synchronization symbol, and then, while changing the sizes of a pair of correlation processing windows, extracts self correlation processing signals from the received digital signal by using the correlation processing windows, and performs correlation processing for the extracted self correlation processing signal, then, while shifting a reference signal, performs pattern matching processing between the reference signal and the correlated signal obtained by the result of the correlation processing, and estimates a shift point of the minimum distance as the base point of the synchronization symbol, and based on the positional information of the estimated base point of the synchronization symbol, estimates the offset amount of a receiving point of the digital signal with respect to the base point of the synchronization symbol. Hereinafter, the present invention will be described in detail by using specific embodiments. Note that although explanation will be given for the case of a pilot symbol exemplary as a synchronization symbol in the embodiments, a synchronization symbol may be one other than a pilot symbol. That is, anything being applied to the head of the communication frame to synchronize with a reception signal is acceptable.

Embodiment 1

Figure 1:
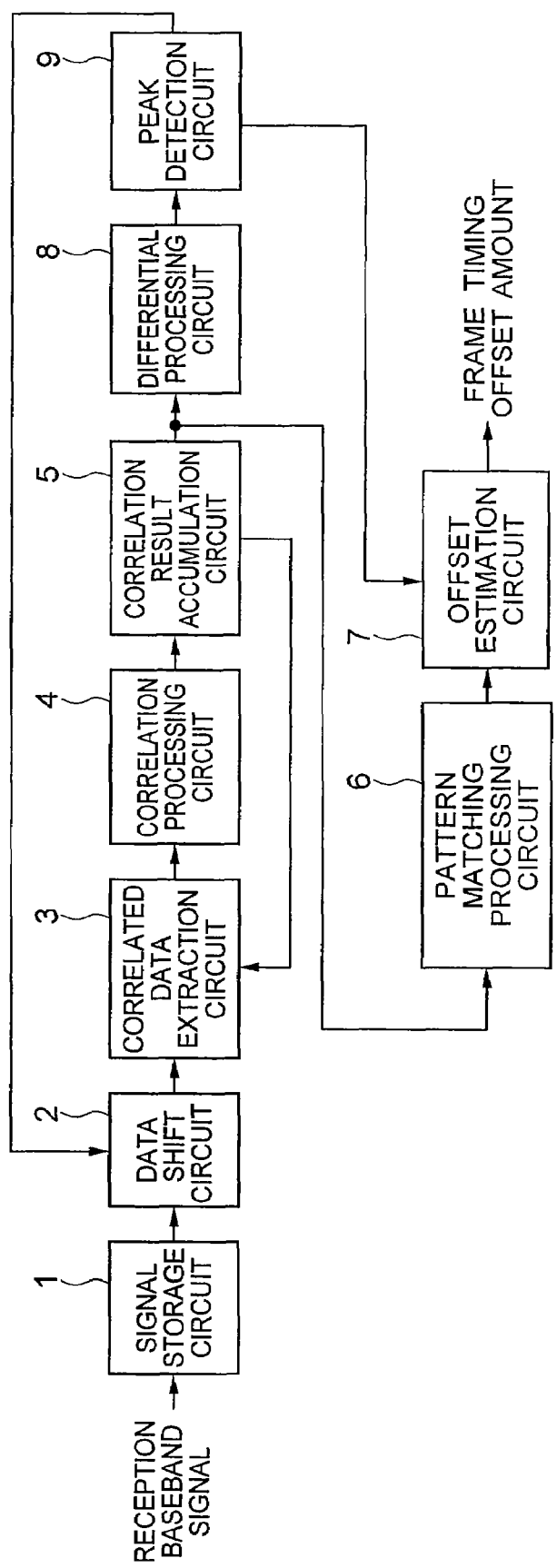
FIG. 1 is a block diagram showing the configuration of a device for detecting a communication frame base point through blind processing according to a first embodiment of the present invention.

A device for detecting a communication frame base point through blind processing according to a first embodiment of the present invention shown in FIG. 1 includes a signal storage circuit 1, a data shift processing circuit 2, a correlated data extraction circuit 3, a correlation processing circuit 4, a correlation result accumulation circuit 5, a pattern matching processing circuit 6, and an offset estimation circuit 7. Further, a differential processing circuit 8 and a peak detection processing circuit 9 are further included.

The signal storage circuit 1 has a function of temporarily storing reception baseband signals received.

The data shift circuit 2 has a function of performing data shift processing for X numbers (X is an integer) from the head of data to a reception baseband signal read out from the signal storage circuit 1. The initial value of X is set to zero. The data shift processing circuit 2 has such a function of first performing data shift processing to the reception baseband signal based on the initial value, and then, with a value X estimated by a peak detection circuit (complementation unit) described later being an input, changing the initial value of the data shift to the input value X from the peak detection circuit 9 to thereby perform data shift processing again to the reception baseband signal. The signal storage circuit 1 and the data shift circuit 2 constitute a shift unit for data-shifting the digital communication signal, based on the shift amount estimated by a complementation unit described later.

The correlated data extraction circuit 3 has a function of extracting correlation processing data for performing self correlation processing. More specifically, the correlated data extraction circuit 3 uses a pair of correlation processing windows 30a and 30b shown in FIG. 3B so as to extract self correlation processing signals from the data shift signal, data-shifted by the data shift circuit 2, in the correlation processing windows 30a and 30b. The distance between the pair of correlation processing windows 30a and 30b is set to a length corresponding to a distance Nf between adjacent pilot symbols 19a and 19a. Further, based on a size change instruction from the correlation result accumulation circuit 5 which is described later, the correlated data extraction circuit 3 has a function of setting the basic size $W_1$ of each of the correlation processing windows 30a and 30b to '1', and while expanding it to a size $W_2$ which is two times as large as the basic size $W_1$ up to the maximum size $W_{Nf}$ which is Nf times as large as the basic size $W_1$, extracting the correlation processing data from the data shift signal in the correlation processing windows 30a and 30b. The correlated data extraction circuit 3 constitutes an extraction unit for extracting self correlation processing signals from a digital communication signal having a signal frame for synchronization by using the pair of correlation processing windows 30a and 30b of variable sizes.

The correlation processing circuit 4 has a function of performing self correlation processing for two self correlation processing signals extracted in the pair of correlation processing windows 30a and 30b of the correlated data extraction circuit 3. Each of the two self correlation processing signals is data that each of the pair of correlation processing windows 30a and 30b extracted from the data shift signal for performing self correlation processing. When the correlation processing circuit 4 performs correlation processing for the two self correlation processing signals, a correlated signal T having a characteristic property as shown in FIG. 4 is detected.

The correlation result accumulation circuit 5 is to accumulate and store data of correlation processing result which was correlation-processed in the correlation processing circuit 4 for each of size $W_1$, $W_2$ ... $W_{Nf}$ of the correlation processing windows 30a and 30b. The circuit has a function of outputting an instruction, to the data shift processing circuit 2, for expanding the size W of the correlation processing windows 30a and 30b from the basic size $W_1$ to the maximum size $W_{Nf}$ sequentially each time correlated data, correlation-processed, is outputted from the correlation processing circuit 4. The correlation processing circuit 4 and the correlation result accumulation circuit 5 constitute a correlation unit for performing self correlation processing to the self correlation processing signals extracted.

The pattern matching processing circuit 6 has a function of reading out correlated data from the correlation result accumulation circuit 5, and performing pattern matching processing between the correlated signal T and the reference signal 18 by the correlated data.

That is, the pattern matching processing circuit 6 has a function of sequentially reading out correlated data (correlated signal T having characteristic property) held by the correlation result accumulation circuit 5 for each size $W_1$, $W_2$ ... $W_{Nf}$ of the correlation processing windows 30a and 30b, and for each size $W_1$, $W_2$ ... $W_{Nf}$ of the correlation processing windows 30a and 30b, shifting the reference signal 18 with respect to the correlated signal T having a characteristic property as shown in FIG. 4 so as to perform pattern matching to thereby calculate the distance between respective points of the reference signal 18 and the correlated signal T.

More specifically, assuming that distance information of the stored correlated data (correlated signal T) is $R_n$ (n=1~Nf), distance information of the shifted reference signal 18 is $S_m$ (m=1~M), the distance $\Delta d_t$ between respective points of the reference signal 18 and the correlated signal T through pattern matching is expressed by the following equation (1). The pattern matching processing circuit 6 calculates the distance based on the equation (1).

$$\Delta d_t = \sum_{t=1}^{N}\left(\sum_{m=1}^{M}(R_{m+1}-S_m)^2\right) \quad (1)$$

Note that N and M are integers, and M<N.

The pattern matching processing circuit 6 generates the distance data $\Delta d_t$ for the amount corresponding to the number of data of the correlated signal T that the reference signal 18 is shifted. The pattern matching processing circuit 6 constitutes a matching unit which performs pattern matching processing between the correlated signal, self-correlation-processed, and the reference signal.

The offset estimation circuit 7 has a function of estimating a basic point 19c of a pilot symbol 19a and an offset amount ($\Delta N$) of a receiving point (A or B) of a reception baseband signal with respect to the base point 19c, with the distance data $\Delta d_t$ from the pattern matching processing circuit 6 being an input.

That is, a shift point where the distance between the reference signal 18 and the correlated signal T becomes the shortest, among the distance data $\Delta d_t$ calculated by shifting the reference signal 18 with respect to the correlated signal T and performing the pattern matching processing, becomes a position corresponding to the base point 19c of the pilot symbol 19a. Therefore, based on the distance data generated by the pattern matching processing circuit 6, the offset estimation circuit 7 estimates the shift point where the distance becomes the shortest as the base point 19c of the pilot symbol 19a.

Figure 3A:
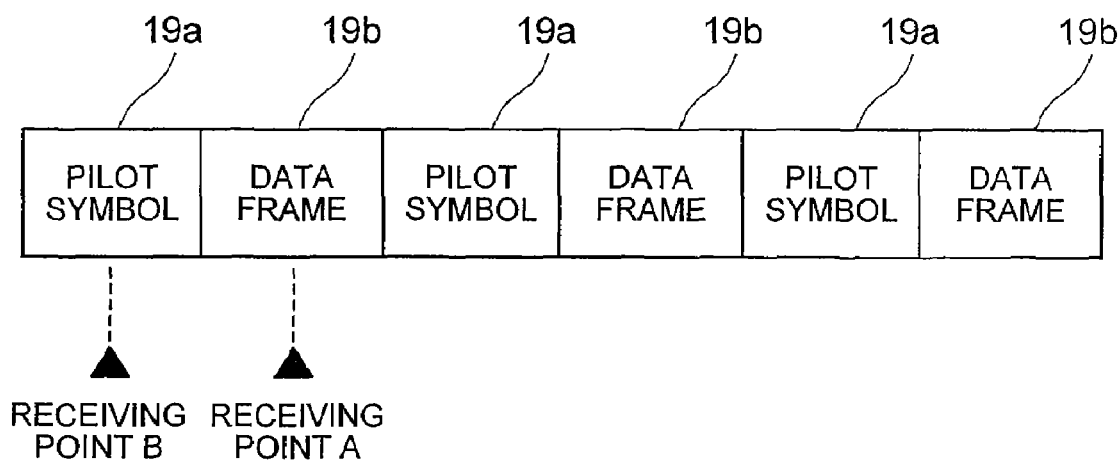
FIG. 3A is a diagram showing the signal structure of a communication frame.

Further, the offset amount ($\Delta N$) from the receiving point A of the reception baseband signal to the base point 19c of the pilot symbol 19a shown in FIG. 3, that is, the offset amount ($\Delta N$) of the receiving point A of the reception baseband signal with respect to the base point 19c of the pilot symbol 19a, is expressed by the following equation (2), where the estimated position of the base point 19c of the pilot frame 10 is N'.

$$\Delta N = Nf - N' \quad (2)$$

Therefore, the offset estimation circuit 7 estimates the offset amount ($\Delta N$) based on the equation (2).

In the description above, it is on the premise that the correlated signal T is not affected by the timing of receiving a reception baseband signal. However, there is a case where the correlated signal T is affected depending on the timing of receiving a reception baseband signal, so the base point 19c of the pilot symbol 19a cannot be estimated accurately. Therefore, in the present embodiment, the differential processing circuit 8 and the peak detection circuit 9 are added. The differential processing circuit 8 and the peak detection circuit 9 constitute a complementation unit which performs differential detection processing and peak base point detection processing to the self-correlation-processed signal processed by the correlation unit to thereby estimate the amount for data-shifting the digital signal.

The differential processing circuit 8 has a function of performing differential detection processing in order to perform shift amount estimation by the pattern matching processing circuit 6 with stable accuracy irrespective of the position where the reception baseband signal is received. More specifically, the differential processing circuit 8 has a function of performing characteristic detection through differential detection processing. The differential detection processing by the differential processing circuit 8 is to perform differential processing to the correlated data, correlation-processed, with correlated data of an adjacent channel. That is, assuming that distance information of accumulated correlated data in one channel of the adjacent channels is $R_n$ (n=1~Nf), and distance information of correlated data accumulated in the other adjacent channel is $R_{n+1}$ (n+1=1~$N_f$), a differential result $P_n$ is expressed by the following equation (3).

$$Pn = |(R_{n+1} - Rn)| \quad (3)$$

The differential processing circuit 8 has a function of performing differential processing to the correlated data, correlation-processed, with correlated data of an adjacent channel to thereby calculate a differential result Pn.

Figure 6:
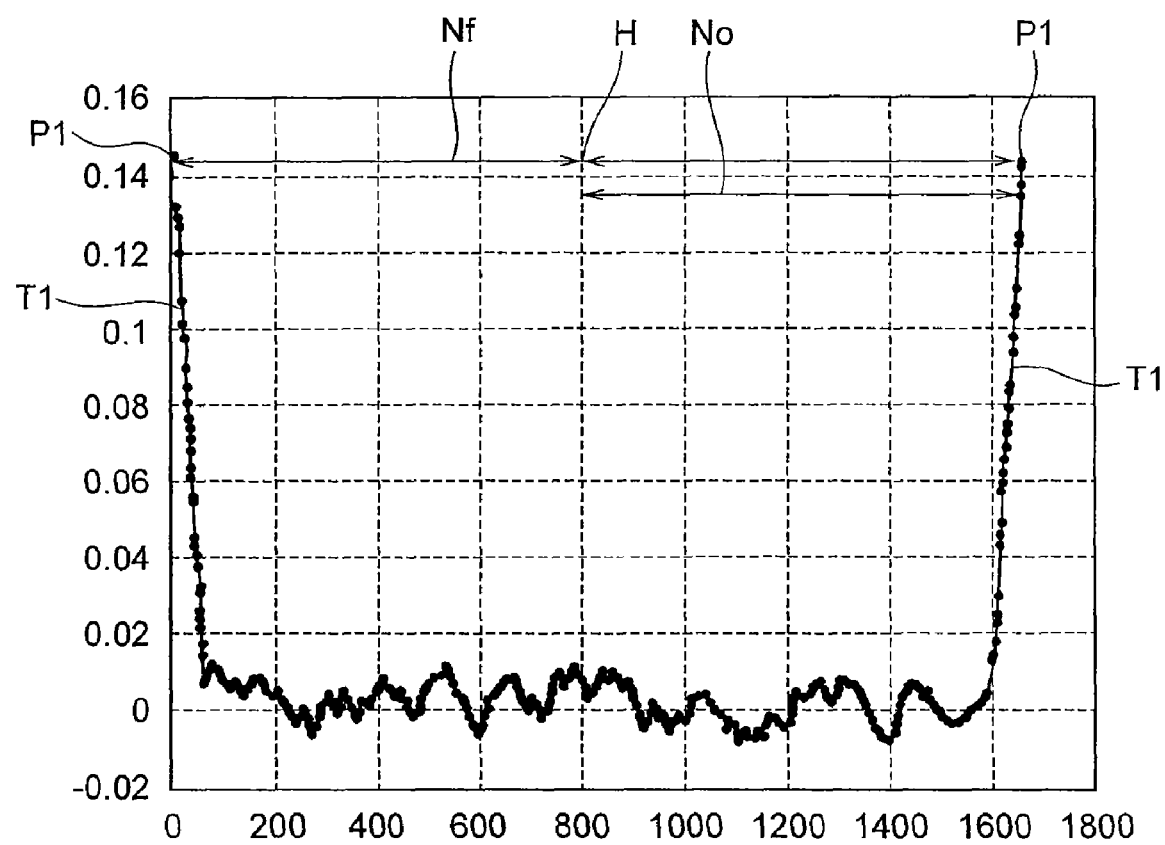
FIG. 6 is a characteristic chart showing a result of performing differential processing to the correlated signal shown in FIG. 5.

The peak detection circuit 9 extracts a tilt component of the correlated signal T based on the correlated data, correlation-processed, with the differential result Pn by the differential processing circuit 8 being an input. Since a part coinciding with the pilot symbol 19a increases linearly, correlated signals T and T having a waveform as shown in FIG. 6, in which the vicinity of the center of an increment $T_0$ shows the top H, are obtained based on the differential result Pn. Therefore, the peak detection circuit 9 has a function of detecting the top H in the vicinity of the center of the increment $T_0$, serving as a peak point, calculating distance data $N_0$ between the peak point and a position at a half of the maximum size Nf in the correlated data which was correlation-processed, and outputting the distance data $N_0$ to the data shift circuit 2 as the data shift amount.

The data shift circuit 2 has a function of changing the data shift amount X of the initial value to a data shift amount (corresponding to distance data $N_0$) from the peak detection circuit 9, to thereby shift the receiving point B of the reception baseband signal used for estimation processing by the data shift amount (corresponding to distance data $N_0$).

Figure 7:
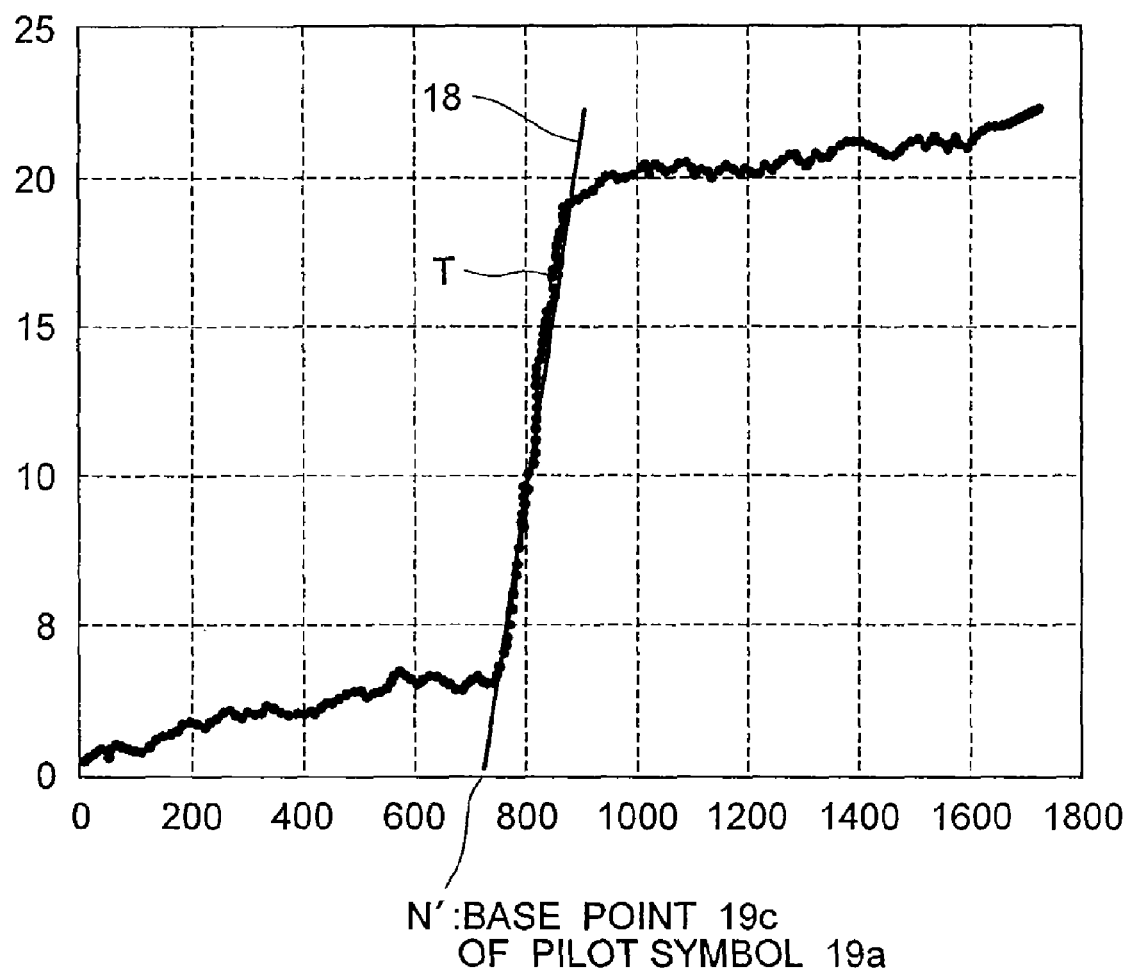
FIG. 7 is a characteristic diagram showing a correlation processing result with respect to a data-shifted reception baseband signal and a result of pattern matching processing.

When by shifting the receiving point B in the data frame 19b by the distance $N_0$ by the data shift circuit 2, the part coinciding with the pilot symbol 19a is shifted to almost the center of the correlation processing result as shown in FIG. 7, so it is found that shift estimation by pattern matching is easily possible. The point shown in FIG. 7 is a part coinciding with the base point position of the pilot symbol. Assuming that the estimated position of the base point 19c of the pilot symbol 19a is N', and the distance between the peak point and the position at a half of the maximum size $W_{Nf}$ (=Nf) in the correlated data which was correlation-processed is $N_0$, the offset amount $\Delta N$ of the reception baseband signal from the base point 19c of the pilot symbol 19a is calculated from the following equation (4).

$$\Delta N = Nf - (N' + N_0) \quad (4)$$

The offset estimation circuit 7 has a function of estimating the offset amount $\Delta N$, in the case that the receiving point B of the reception baseband signal is shifted, based on the equation (4). Thereby, a computation unit is constituted with a function of estimating the base point 19c of the pilot symbol 19a and the offset amount ΔN of the reception baseband signal to the base point 19c, based on the distance information of the pattern matching processing, and a function of estimating the length of the pilot symbol based on factors exposed by performing data inversion processing to the self correlated processing signal by an inversion unit described later.

Next, operation of a device for detecting a communication frame base point through blind processing according to the embodiment 1 will be described based on FIG. 2 by utilizing a simulation result, with a communication frame configuration show in FIG. 3 as an example.

Figure 2:
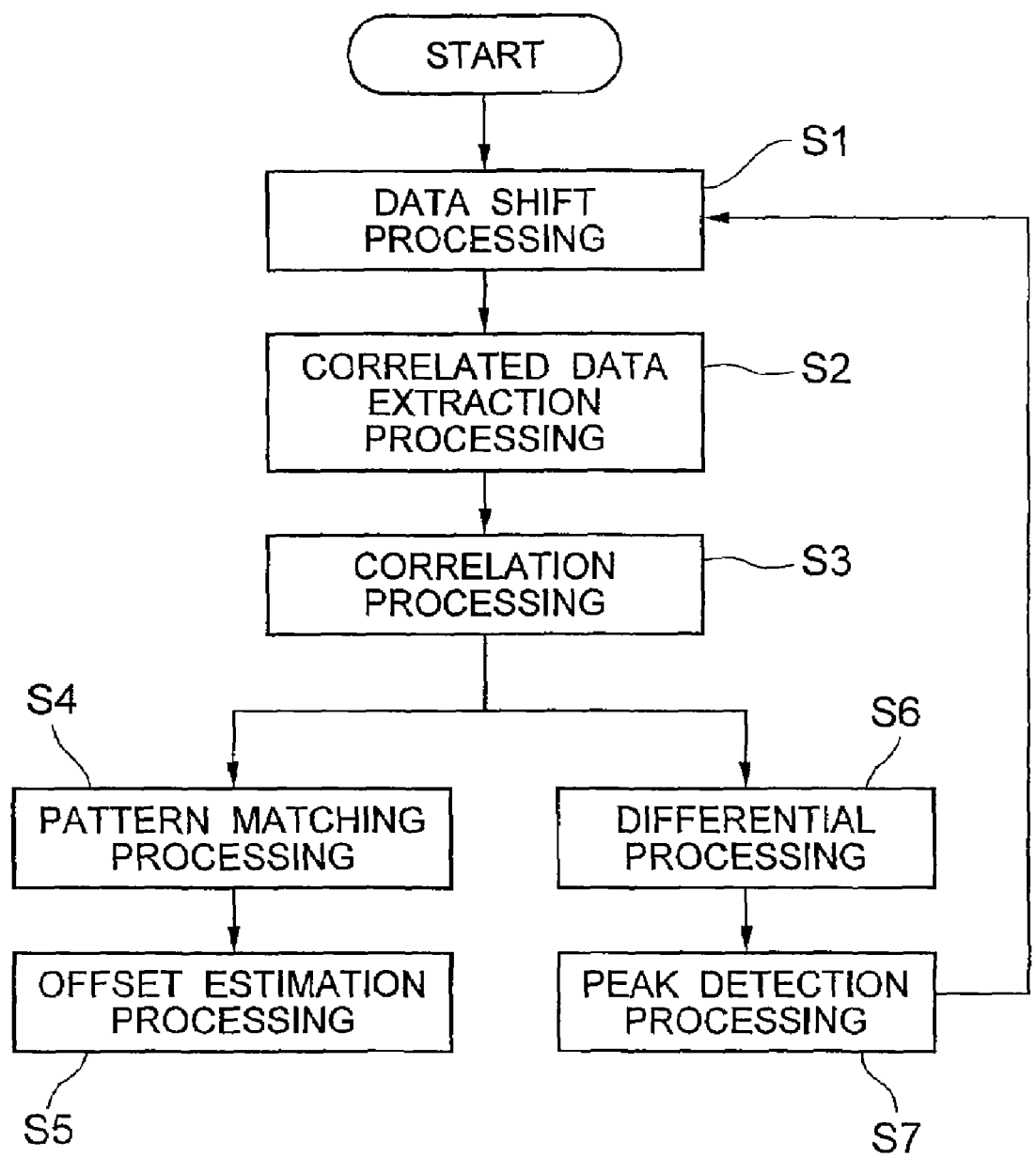
FIG. 2 is a flowchart showing the operation of the device for detecting a communication frame base point through blind processing according to the first embodiment of the present invention for each processing step.

At the start time of operation shown in FIG. 2, the received reception baseband signal is stored temporarily in the signal storage circuit 1. In this case, a starting position of receiving the reception baseband signal is assumed to be a point A in the data frame 19b of the reception baseband signal shown in FIG. 3A.

When the processing proceeds to a data shift processing step S1, the data shift circuit 2 reads out the reception baseband signal temporarily stored on the signal storage circuit 1, and to the reception baseband signal read out, performs data shift for the number of X (initial value of zero) from the head of the data, that is, the pilot symbol 19a, and outputs the resultant data to the correlated data extraction circuit 3.

Figure 3B:
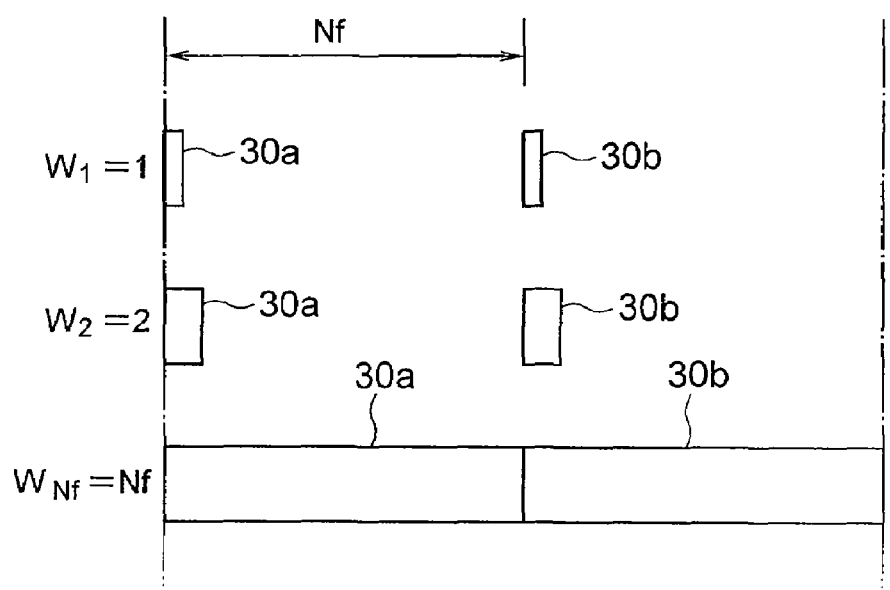
FIG. 3B is a diagram for explaining correlation processing windows.

When a series of processing proceeds to a correlated data extraction processing step S2, the correlated data extraction circuit 3 sets the size W of the pair of correlation processing windows 30a and 30b having a distance corresponding to the distance Nf between the adjacent pilot symbols 19a and 19a, as shown in FIG. 3B, to the basic size W1, and by using the correlation processing windows 30a and 30b, extracts self correlation processing signals for performing self correlation processing from the data shift signal which was data-shift processed by the data shift circuit 2.

Next, when the series of processing proceeds to a correlation processing step S3, the correlation processing circuit 4 performs self correlation processing for the two self correlation processing signals extracted in the correlation processing windows 30a and 30b.

When the self correlation processing by the correlation processing circuit 4 is completed, the correlation result accumulation circuit 5 stores correlated data correlation-processed by the correlation processing circuit 4. At the time when the correlated data extraction processing step S2 and the correlation processing step S3 using the correlation processing windows 30a and 30b of the basic size W1 are completed and the correlated data is stored, the correlation result accumulation circuit 5 outputs, to the correlated data extraction circuit 3, an instruction for setting the size W of the correlation processing windows 30a and 30b to two times as large as the basic size W1.

When the correlated data extraction circuit 3 receives the instruction from the correlation result accumulation circuit 5, it sets the size W of the correlation processing windows 30a and 30b to two times as large as the basic size W1, and extracts self correlation processing signals, as described above. For the self correlation processing signals extracted, processing of the correlation processing step S3 is performed, and the correlation result accumulation circuit 5 accumulates and stores the correlated data correlation-processed by the correlation processing circuit 4.

At the time that the correlated data extraction processing step S2 and the correlation processing step S3 using the correlation processing windows 30a and 30b of the doubled size $W_2$ are completed and the correlated data is accumulated and stored, the correlation result accumulation circuit 5 outputs an instruction to sequentially change the size W of the correlation processing windows 30a and 30b up to the maximum size $W_{Nf}$ to the correlated data extraction circuit 3, and accumulates and stores the correlated data in which the correlated data extraction processing step S2 and the correlation processing step S3 are completed by using the correlation processing windows 30a and 30b of the size W.

Note that when the correlation processing circuit 4 performs correlation processing for each window size $W_1, W_2, \ldots W_{Nf}$ of the correlation processing windows 30a and 30b for the two self correlation processing signals, a signal component T having a characteristic property as shown in FIG. 4 is detected for each window size $W_1, W_2, \ldots W_{Nf}$ of the correlation processing windows 30a and 30b.

When the series of processing proceeds to the pattern matching processing step S4, the pattern matching processing circuit 6 reads out correlated data accumulated and stored on the correlation result accumulation circuit 5. Then, the pattern matching processing circuit 6 uses a signal with a tilt corresponding to the tilt 19d of the correlated signal T obtained through the correlation processing by the correlation processing circuit 4 as a reference signal 18, and shifts the reference signal 18 toward the correlated signal T raised precipitously (in the case of FIG. 4, coordinate 1180) from the reference position (in the case of FIG. 4, coordinate 0) as shown in FIG. 4, and performs pattern matching between the correlated signal T and the reference signal 18, to thereby calculate the distance between the respective points of the reference signal 18 and the correlated signal T.

More specifically, the pattern matching processing circuit 6 calculates the distance $\Delta d_t$ between the respective points of the reference signal 18 and the correlated signal T through pattern matching based on the following equation (1), where distance information of the accumulated correlated data (correlated signal T) is $R_n$ (n=1~Nf), and distance information of the shifted reference signal 18 is $S_m$ (m=1~M).

$$\Delta d_t = \sum_{t=1}^{N}\left(\sum_{m=1}^{M}(R_{m+1}-S_m)^2\right) \quad (1)$$

Note that the pattern matching processing circuit 6 creates the distance data $\Delta d_t$ corresponding to the number of correlated data (correlated signal T) in which the reference signal 18 is shifted, through the pattern matching processing.

When the pattern matching processing ends and the processing proceeds to an offset estimation processing step S5, with the distance data $\Delta d_t$ from the pattern matching processing circuit 6 being an input, the offset estimation circuit 7 estimates a shift point where the distance between the reference signal 18 and the correlated signal T becomes the shortest, among the distance data $\Delta d_t$ obtained through the pattern matching processing by the pattern matching processing circuit 6, as the base point 19c of the pilot symbol 19a.

The offset amount (ΔN) from the receiving point A of the reception baseband signal shown in FIG. 3 to the base point 19c of the pilot symbol 19a, that is, the offset amount (ΔN) of the receiving point A of the reception baseband signal with respect to the base point 19c of the pilot symbol 19a, is expressed by the following equation (2), where the position of the base point 19c of the pilot symbol 19a estimated as described above is N'.

$$\Delta N = Nf - N' \quad (2)$$

Therefore, the offset estimation circuit 7 estimates the offset amount (ΔN) based on the equation (2).

Different from the description above, the case where the starting position to receive a reception baseband signal is a point B in the pilot symbol 19*a* shown in FIG. 3 will be described.

Figure 5:
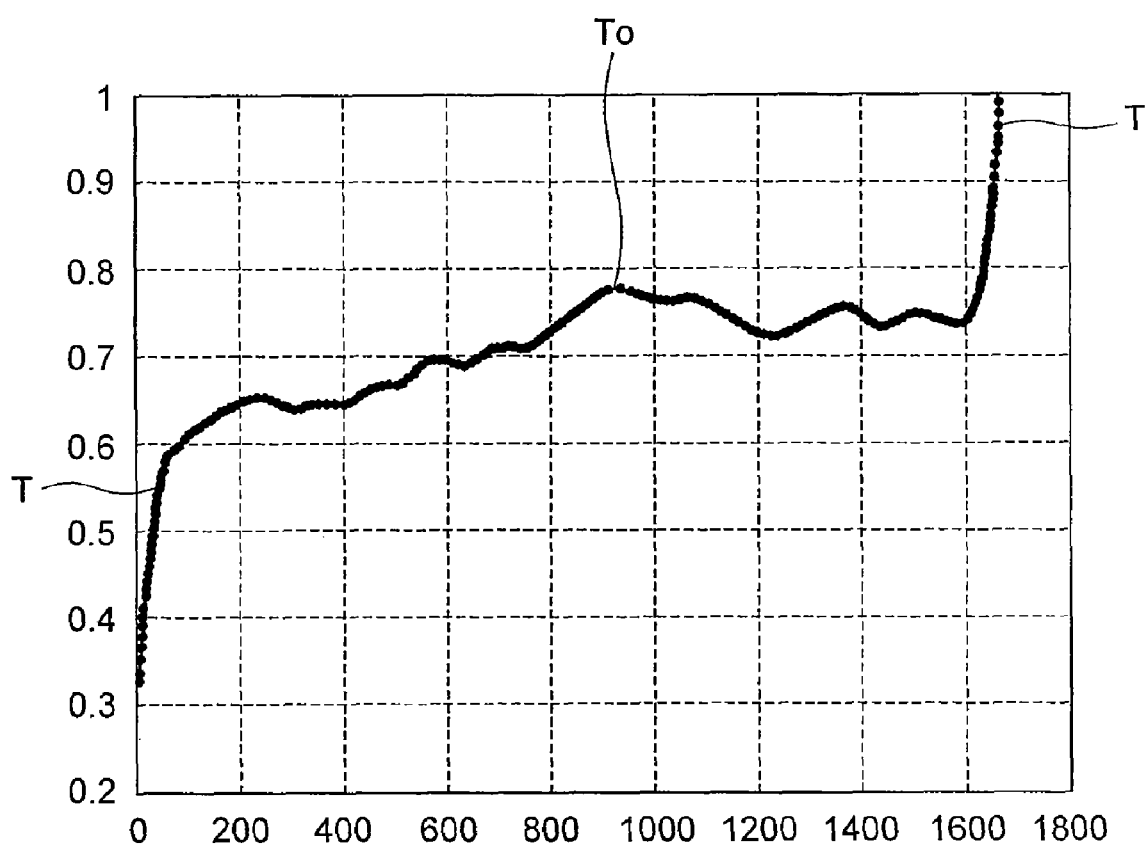
FIG. 5 is a characteristic chart showing a correlation processing result in the case where a reception signal is received in a pilot symbol area.

Same as the description above, from the time of receiving a reception baseband signal, the pair of correlation processing windows 30*a* and 30*b* having a distance corresponding to the distance Nf between the adjacent pilot symbols 19*a* and 19*a* are created, and correlation processing is performed while changing the size W of the windows 30*a* and 30*b*. When processing to estimate the base point of the pilot symbol by the pattern matching processing is performed based on the correlation processing result shown in FIG. 5, the correlated signals T and T having a characteristic property appeared in the area of the pilot symbol 19*a* is divided into two parts, that is, front and back, as shown in FIG. 5, so it is impossible to estimate the base point 19*c* of the pilot symbol 19*a* accurately.

In view of the above, in the present embodiment, if the starting position to receive the reception baseband signal is the point B in the pilot symbol 19*a* shown in FIG. 3, a differential processing step S6 and a peak detection processing S7 are performed at the time when the correlation processing step S3 ends.

When the processing proceeds to the differential processing step S6, with the correlated data from the correlation processing circuit 4 being an input, the differential processing circuit 8 performs differential detection processing in order to perform shift amount estimation by the pattern matching processing circuit 6 with stable accuracy irrespective of the position where the reception baseband signal is received. More specifically, the signal structures of the pilot symbol 19*a* and the data frame 19*b* are those allocated corresponding to the communication channel, so the differential detection processing performed by the differential processing circuit 8 is to perform differential processing to the correlated data, correlation-processed by the correlation processing circuit 4, with correlated data of the adjacent channel. That is, assuming that distance information of correlated data accumulated in one of the adjacent channels is $R_n$ (n=1~Nf), and distance information of correlated data accumulated in the other one of the adjacent channels is $R_{n+1}$ (n+1=1~Nf), the differential result $P_n$ is expressed by the following equation (3).

$$Pn=|(R_{n+1}-R_n)| \quad (3)$$

The differential processing circuit 8 performs differential processing to the correlated data, correlation-processed, with correlated data of the adjacent channel to thereby calculate a differential result $P_n$.

When the differential result $P_n$ is calculated and the processing proceeds to the peak detection processing step, the peak detection processing circuit 9 extracts a tilt component of correlated data (correlated signal), which was correlation-processed, with the differential result Pn by the differential processing circuit 8 being an input. Since a part coinciding with the pilot symbol, among the correlated data, increases linearly, a signal having a waveform with the vicinity of the center of an increment $T_0$ being the top H, as shown in FIG. 6, is obtained as a signal of the differential result $P_n$.

Based on the signal shown in FIG. 6, the peak detection circuit 9 detects the peak point P1 of the correlated signal T1 having the tilt component, and calculates distance data $N_0$ between the peak point P1 and the position H at a half of the maximum size $W_{Nf}$(=Nf) of correlation processing. When the receiving point B of the reception baseband signal is shifted by the distance data $N_0$, it is possible to move from the state shown in FIG. 6 to a state enabling pattern matching processing by the pattern matching processing circuit 6 irrespective of the receiving point A or B as shown in FIG. 7. The peak detection circuit 9 outputs the calculated distance data $N_0$ to the data shift circuit 2 as the data shift amount.

The data shift circuit 2 changes the data shift amount of the initial value to the data shift amount (corresponds to distance data $N_0$) from the peak detection circuit 9, and shifts the receiving point B of the reception baseband signal used for estimation processing by the distance data $N_0$ which is the data shift amount.

When the data shift processing of the receiving point B of the reception baseband signal by the data shift circuit 2 is completed, the processing again proceeds to the correlated data extraction processing step S2. In the correlated data extraction processing step S2, the correlated data extraction circuit 3 prepares a pair of correlation processing windows 30*a* and 30*b* with a distance corresponding to the distance Nf between the adjacent pilot symbols 19*a* and 19*a* as shown in FIG. 3B, and while expanding the size W of the correlation processing windows 30*a* and 30*b*, that is, expanding the size W from the basic size $W_1$ up to the maximum size $W_{Nf}$, and extracts self correlation processing signals from the data shift signal outputted from the data shift circuit 2 by using the correlation processing windows 30*a* and 30*b*, and outputs the self correlation processing signals to the correlation processing circuit 4.

Next, when the series of processing proceeds to the correlation processing step S3, the correlation processing circuit 4 performs self correlation processing for the two self correlation processing signals extracted in the correlation processing windows 30*a* and 30*b*, and extracts a correlated signal T having a characteristic property coinciding with the pilot symbol as shown in FIG. 7.

When the self correlation processing by the correlation processing circuit 4 is completed, the correlation result accumulation circuit 5 stores the correlated data correlation-processed and accumulated by the correlation processing circuit 4. The correlation result data stored on the correlation result accumulation circuit includes a correlated signal T having a characteristic property in the case of performing correlation processing by changing the window size $W_1, W_2 \ldots W_{Nf}$ of the correlation processing windows 30*a* and 30*b*.

When the series of processing proceeds to the pattern matching processing step S4, the pattern matching processing circuit 6 reads out correlated data from the correlation result accumulation circuit 5. Then, the pattern matching processing circuit 6 uses a signal having a tilt corresponding to the correlated signal T obtained through correlation processing by the correlation processing circuit 4 as the reference signal 18 to thereby shift the reference signal 18 from the reference position (in FIG. 7, coordinate 0) toward the correlated signal T raised precipitously as shown in FIG. 7 (in FIG. 7, coordinate 750), and performs pattern matching between the correlated signal T and the reference signal 18 to thereby calculate the distance between the respective points of the reference signal 18 and the correlated signal T.

More specifically, the pattern matching processing circuit 6 calculates the distance $\Delta d_l$ between the respective points of the reference signal 18 and the correlated signal T through pattern matching based on the following equation (1), where the distance information of the correlated data (correlated signal T), correlation-processed, is Rn (n=1~Nf), and distance information of the reference signal 18 is Sm (m=1~M).

$$\Delta d_t = \sum_{t=1}^{N}\left(\sum_{m=1}^{M}(R_{m+1}-S_m)^2\right) \quad (1)$$

Through the pattern matching processing, the pattern matching processing circuit 6 creates distance data corresponding to the number of the correlated data (correlated signal T) in which the reference signal 18 is shifted.

When the pattern matching processing ends and the processing proceeds to the offset estimation processing step S5, the offset estimation circuit 7 estimates the shift point where the distance between the reference signal 18 and the correlated signal T becomes the shortest as the base point 19c of the pilot symbol 19a, among the distance data $\Delta d_t$ through the pattern matching processing by the pattern matching processing circuit 6, with the distance data $\Delta d_t$ from the pattern matching processing circuit 6 and the distance data $N_0$ from the peak detection circuit 9 being inputs.

The offset amount ($\Delta N$) from the receiving point A of the reception baseband signal shown in FIG. 4 to the base point 19c of the pilot symbol 19a, that is, the offset amount ($\Delta N$) of the receiving point A of the reception baseband signal with respect to the base point 19c of the pilot symbol 19a, is expressed by the following equation (4), where the estimated position of the base point 19c of the pilot symbol 19a is N', and the distance data inputted from the peak detection circuit 9 is $N_0$.

$$\Delta N = Nf - (N' + N_0) \quad (4)$$

Therefore, the offset estimation circuit 7 estimates the offset amount $\Delta N$ in the case that the starting position to receive the reception baseband signal is the point B in the pilot symbol 19a shown in FIG. 3 based on the equation (4).

As described above, according to the present embodiment, there is an advantage that it is possible to estimate the base point 19c of the pilot symbol 19a, and the offset amount $\Delta N$ of the receiving points A, B of the reception baseband signal with respect to the base point 19c, without knowing the pattern of the pilot symbol even when the reception signal starts from any receiving point.

Second Embodiment

Next, a second embodiment in which a data inversion processing function is added to the configuration of FIG. 1 showing the first embodiment will be described based on FIG. 8.

In the first embodiment shown in FIG. 1, if the starting position to receive a reception baseband signal is the point B in the pilot symbol 19a shown in FIG. 3, processing is limited to estimating the base point of the pilot symbol and the offset amount of the receiving point of the reception baseband signal with respect to the base point. However, in the second embodiment shown in FIG. 8, in addition to the base point and a communication parameter of the offset amount, processing to estimate the pattern length of the pilot symbol by reversing the correlated data, which is correlation-processed, is added.

Figure 8:
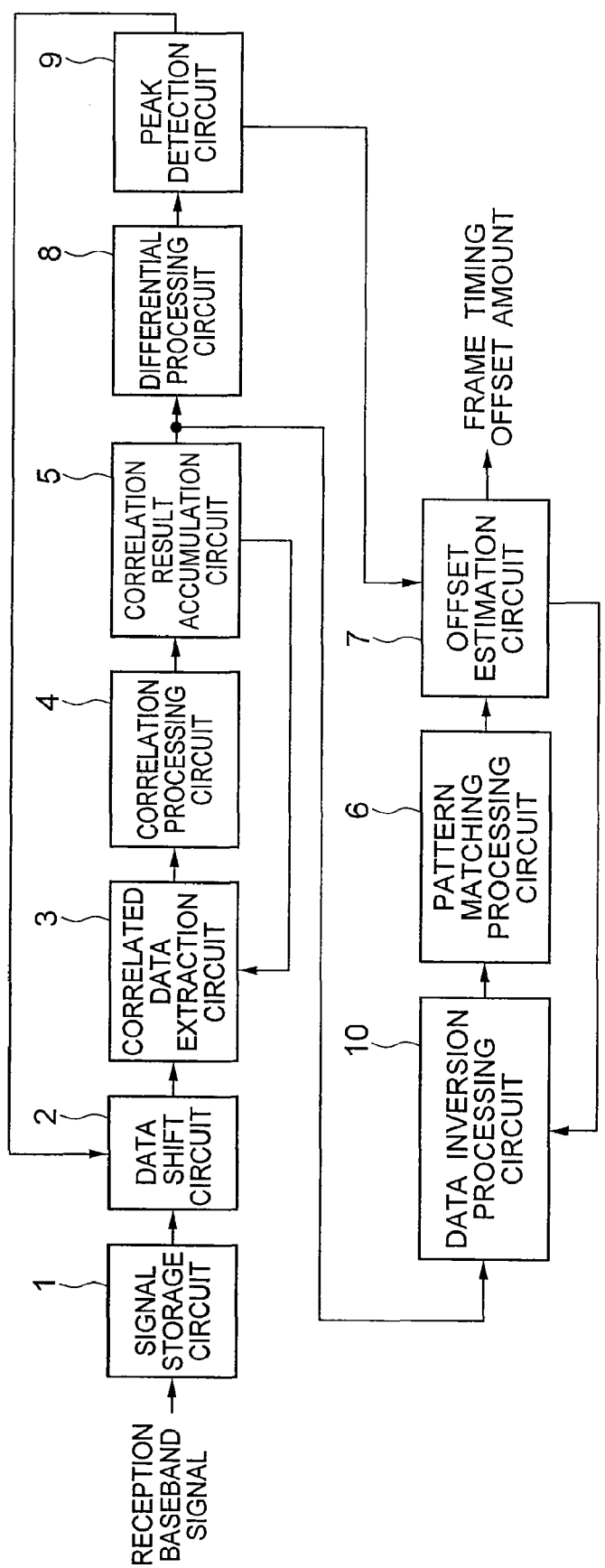
FIG. 8 is a block diagram showing the configuration of a device for detecting a communication frame base point through blind processing according to an second embodiment of the present invention.

As shown in FIG. 8, in the present embodiment, a data inversion processing circuit 10 is added between the correlation result accumulation circuit 5 and the pattern matching processing circuit 6 shown in FIG. 1. The data inversion processing circuit 10 constitutes an inversion unit having a function of inversion-processing correlated data correlation-processed by the correlation unit to thereby expose factors identifying the pattern length of the pilot symbol. The offset estimation circuit 7 includes a function of estimating the pattern length of the pilot symbol based on the factors exposed by the inversion unit (data inversion processing circuit 10).

Figure 9:
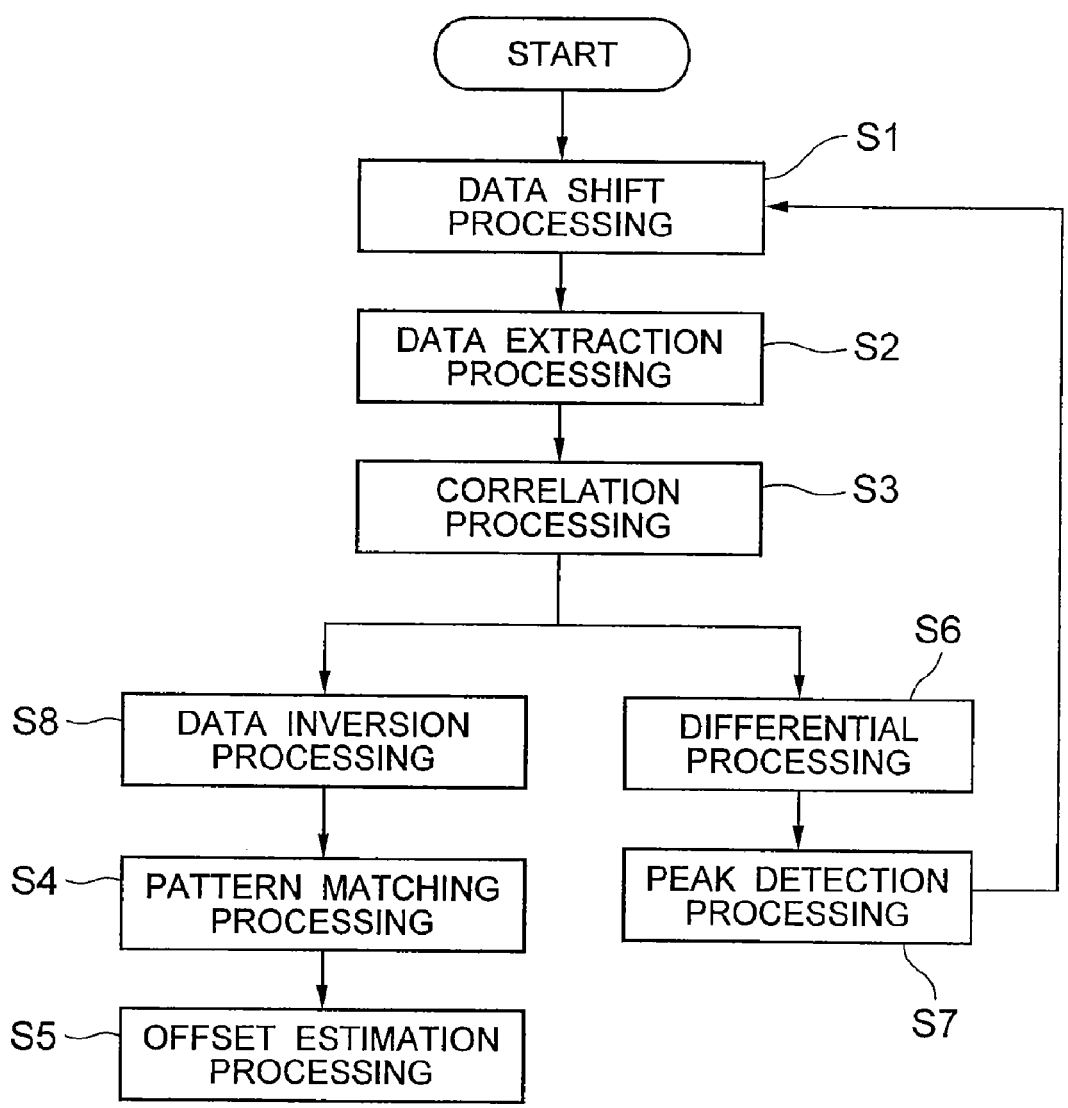
FIG. 9 is a flowchart showing the operation of the device for detecting a communication frame base point through blind processing according to the second embodiment of the present invention for each processing step.

In the case where the starting position to receive the reception baseband signal is the point B in the pilot symbol 19a shown in FIG. 3, the initial value of the data inversion processing circuit 10 shown in FIG. 8 is OFF, and the accumulated correlated data from the correlation result accumulation circuit 5 is directly inputted to the pattern matching processing circuit 6, without being applied with the data inversion processing step S8 by the data inversion processing circuit 10 shown in FIG. 9, and pattern matching processing in the pattern matching processing step S4 is performed in the same manner as the first embodiment. Thereby, the offset estimation circuit 7 estimates the base point 19c (N1) of the pilot symbol 19a shown in FIG. 10, and estimates the offset amount $\Delta N$ of the reception baseband signal with respect to the base point 10a of the pilot symbol 19a (offset estimation processing step S5). The data shift processing step S1, the data extraction processing step S2, the correlation processing step S3, the pattern matching processing step S4, the differential processing step S6 and the peak detection processing step S7, shown in FIG. 9, are performed in the same manner as the processing shown in FIG. 2.

Figure 10:
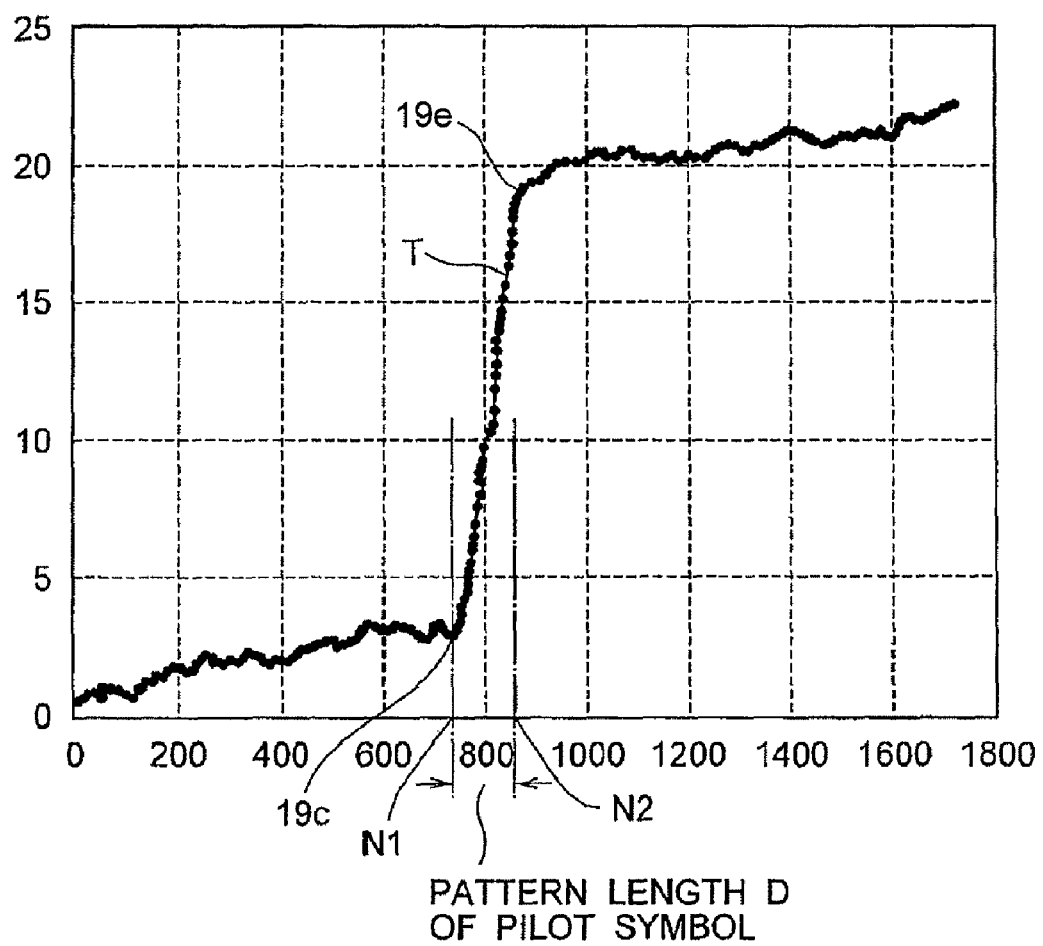
FIG. 10 is a characteristic diagram explaining the operating principle according to pilot symbol estimation processing.

The waveform of a signal, obtained thorough the processing described above, becomes one shown in FIG. 10. In FIG. 10, the distance in a horizontal direction between the raising start position (base point 19c) of the correlated signal T having a characteristic tilt coinciding with the pilot symbol and a saturation point 19e corresponds to the pattern length of the pilot symbol. Therefore, in the second embodiment, by performing data inversion processing to the signal shown in FIG. 10, the pilot length of the pilot symbol is estimated.

That is, when the offset estimation processing circuit 7 estimates the base point 19c (N1) of the pilot symbol 19a, it gives an instruction to the data inversion processing circuit 10 to turn on the data inverting function, and an instruction to the correlation result accumulation circuit 5 to output the correlated data accumulated and stored on the correlation result accumulation circuit 5, to the data inversion processing circuit 10.

Figure 11:
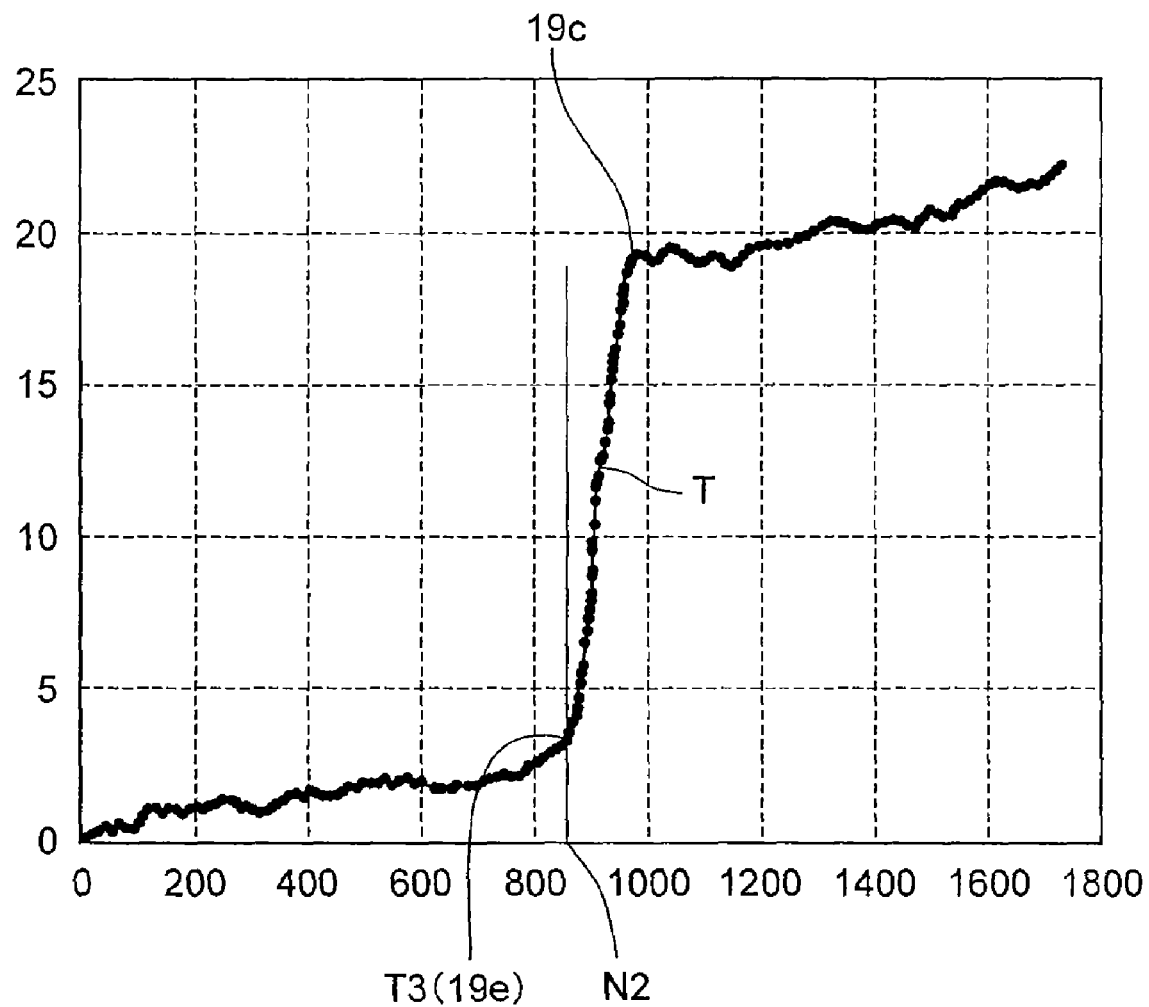
FIG. 11 is a characteristic chart showing an example of correlated data after performing data inversion processing.

In the data inversion processing step S8 shown in FIG. 9, the data inversion processing circuit 10 performs a function of performing data inversion processing to the correlated data, self correlation-processed by the correlation unit, to thereby expose factors to specify the pattern length of the pilot symbol. More specifically, when the data inversion processing circuit 10 receives accumulated correlated data from the correlation result accumulation circuit 5 in the state where the data inverting function is turned on, it performs processing to turn the correlated data by 180° (data inversion processing). When the data inversion processing is performed by the data inversion processing circuit 10, the saturation point 10c of the tilt of the correlated signal T coinciding with the pilot symbol transits to a tilt starting point T3 (19e) as shown in FIG. 11. Note that the raising start point (base point 19c) of the correlated signal T, the saturation point 19e, the tilt starting point T3 and the like correspond to the factors.

Next, the processing proceeds to the pattern matching processing step S4, whereby pattern matching processing is performed by the pattern matching processing circuit 6, and the offset estimation circuit 7 estimates the position of the tilt starting point T3 to which the saturation point 19e of the signal component T is transited. Then, the offset estimation circuit 7 converts the value of the estimated tilt starting point T3 to a value (N2) with respect to the original data before the data inversion processing, and with the difference between the value N1 and the value N2, estimates the pattern length D of the pilot symbol.

According to the second embodiment, there is an advantage that it is possible to estimate the pattern length D of the pilot symbol, in addition to the base point of the pilot symbol and the data offset amount of the receiving point of the reception baseband signal with respect to the base point, without requiring to obtain pattern information of the pilot symbol in advance irrespective of the reception signal being started from any reception signal position.

Third Embodiment

Next, an example in which a counteraction against deterioration in signal quality due to disturbance such as noises is made to the configuration of FIG. 8 showing the second embodiment will be described as a third embodiment.

Figure 12:
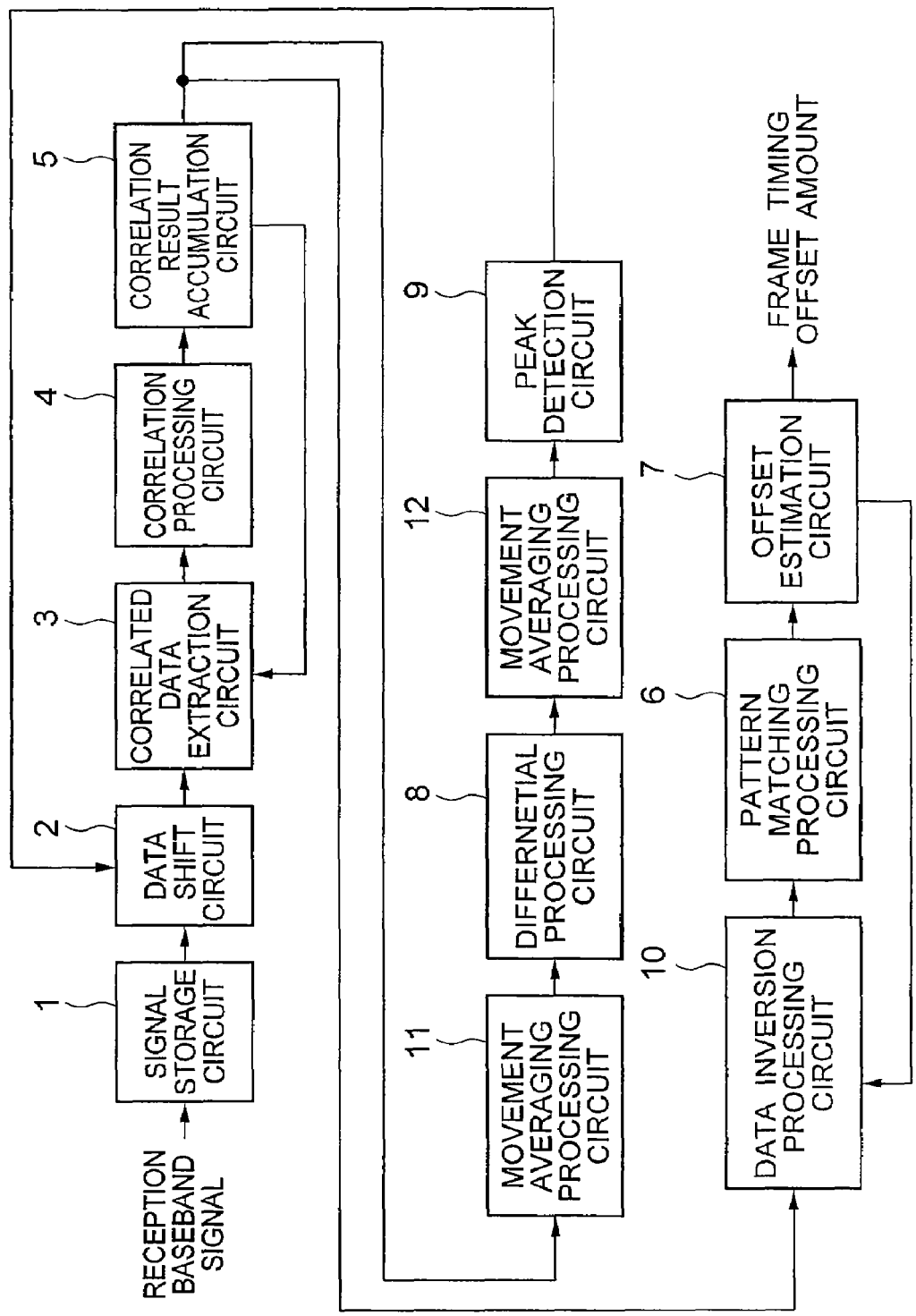
FIG. 12 is a block diagram showing the configuration of a device for detecting a communication frame base point through blind processing according to a third embodiment of the present invention.

As shown in FIG. 12, in the third embodiment 3, movement averaging processing circuits 11 and 12 are added before and after the differential processing circuit 8 in the circuit configuration of the second embodiment 2 shown in FIG. 8. The movement averaging processing circuits 11 and 12 constitute a suppression unit having a function of suppressing disturbance components included in the correlated data (correlated signal) handled by the complementation unit. Note that the data shift processing step S1, the data extraction processing step S2, the correlation processing step S3, the pattern matching processing step S4, the differential processing step S6, the peak detection processing step S7 and the data inversion processing step S8, shown in FIG. 13, are performed in the same manner as the processing shown in FIG. 9.

Figure 14:
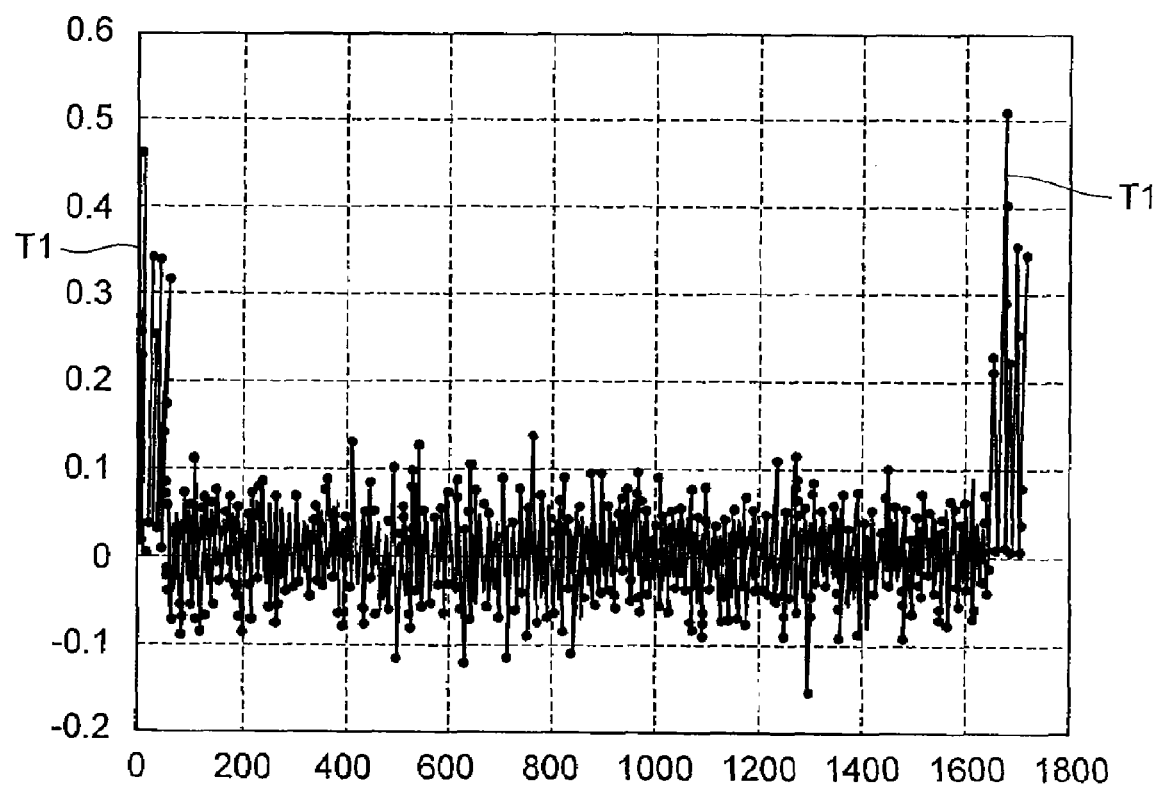
FIG. 14 is a characteristic chart showing an activation processing result in the case where movement averaging processing is not performed.

Due to the radio wave propagation environment, the received reception baseband signal is affected by noises and multipath, so the signal quality is deteriorated. Therefore, as shown in FIG. 14, the signal waveform shown in FIG. 6 may be affected by disturbance. Further, there is a case where correlation detection result does not increase linearly due to the pattern series used for pilot symbol so as to cause large fluctuation component in the differential result.

Figure 13:
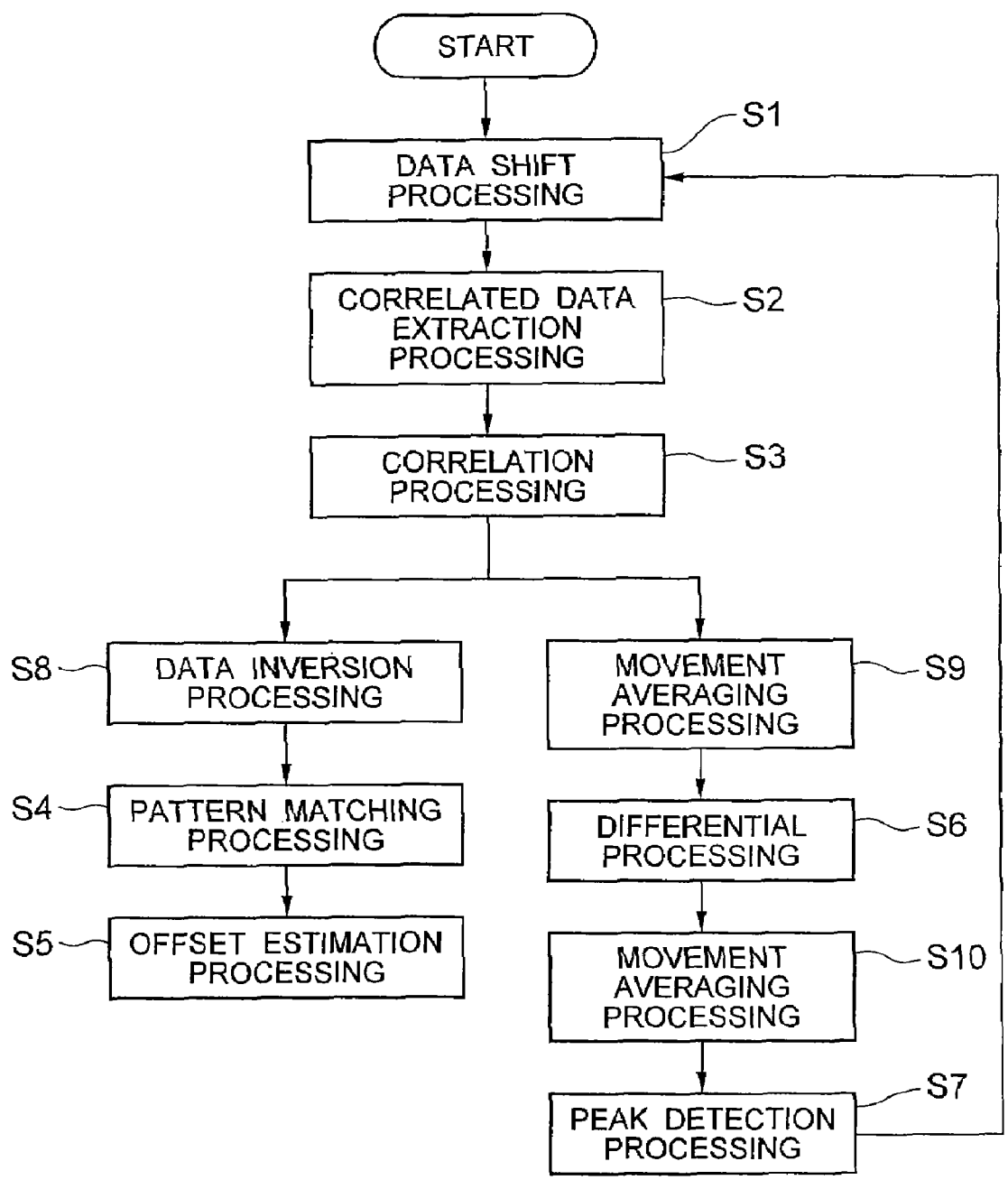
FIG. 13 is a flowchart showing the operation of the device for detecting a communication frame base point through blind processing, for each processing step, according to the third embodiment of the present invention.

In the third embodiment of the present invention, in the movement averaging processing steps S9 and S10 shown in FIG. 13, movement averaging processing is performed to the data after data shift processing and the output result of the differential detection processing step 6 by the movement averaging processing circuits 11 and 12, whereby disturbance shown in FIG. 14 is suppressed and a signal waveform shown in FIG. 6 is obtained. Thereby, estimation accuracy of the differential detection processing performed to the correlation-processed correlated data and the differential-processed data is improved.

According to the third embodiment, by performing movement averaging processing to the correlation-processed correlated data and the differential-processed data, there is an advantage that the estimation accuracy can be improved.

Fourth Embodiment

Next, a fourth embodiment in which a function of changing the tilt of the referential signal 18 is added to the configuration of FIG. 12 showing the third embodiment 3, corresponding to the number of pilot symbols used in processing, will be described based on FIG. 15.

Figure 15:
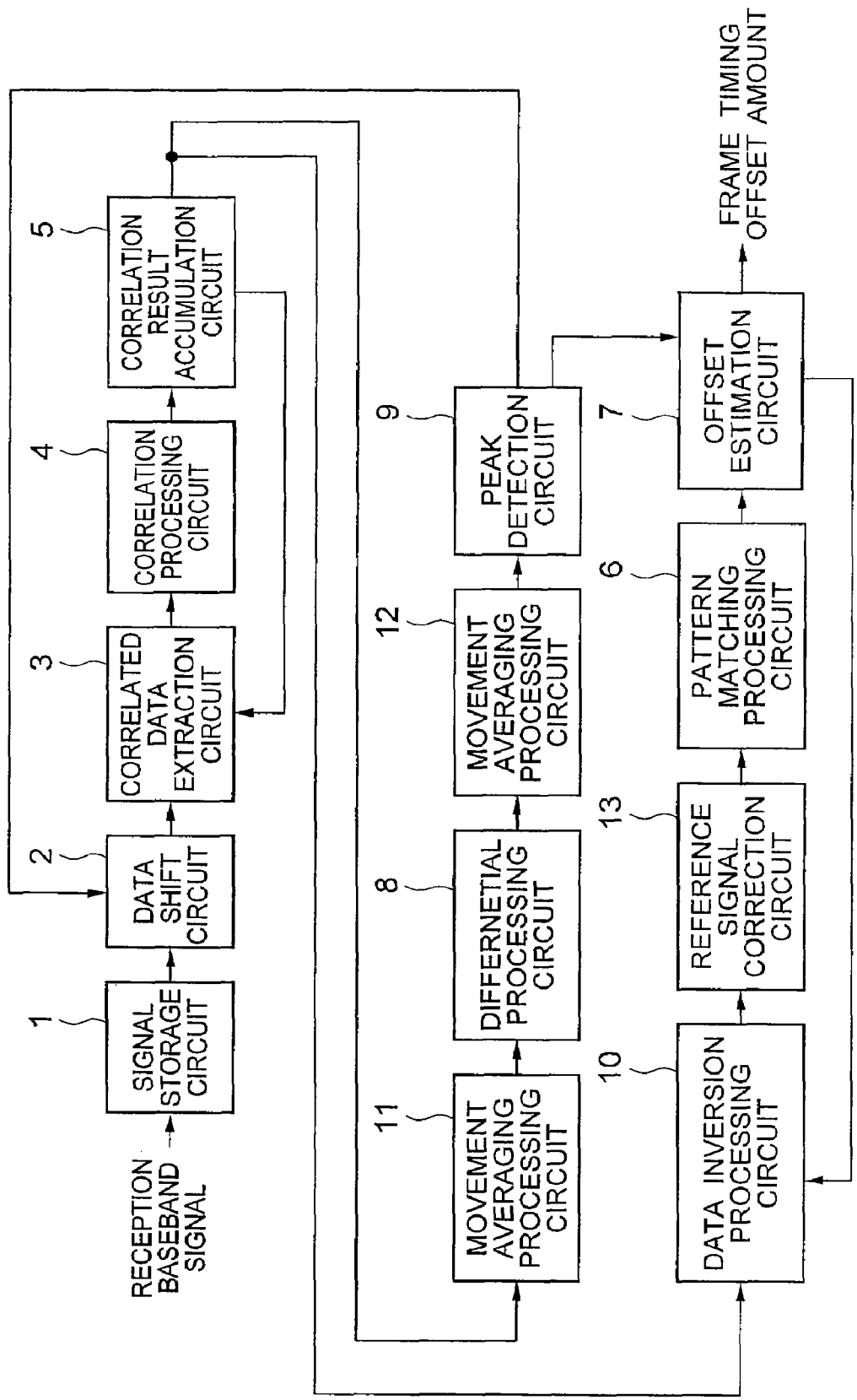
FIG. 15 is a block diagram showing the configuration of a device for detecting a communication frame base point through blind processing according to a fourth embodiment of the present invention.

As shown in FIG. 15, in the fourth embodiment, a reference signal correction circuit 13 is added after the data inversion processing circuit 10 in the circuit configuration of the third embodiment shown in FIG. 12. The reference signal correction circuit 13 constitutes a correction unit for correcting the posture of the reference signal 18 corresponding to the number of pilot symbols used in processing, and suppressing deterioration in estimation processing caused by disturbance. Note that the data shift processing step S1, the data extraction processing step S2, the correlation processing step S3, the pattern matching processing step S4, the differential processing step S6, the peak detection processing step S7, the data inversion processing step S8 and the movement averaging processing steps S9 and S10, shown in FIG. 16, are performed in the same manner as the processing shown in FIG. 9.

Figure 17:
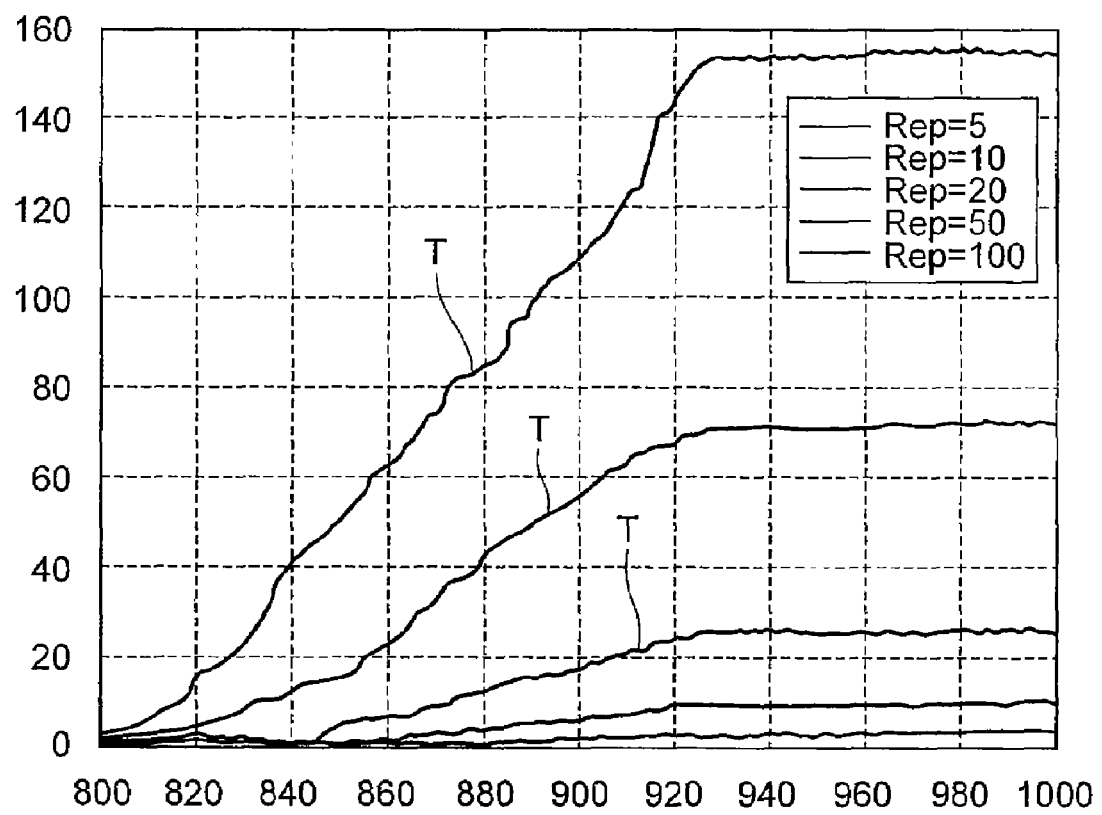
FIG. 17 is a characteristic chart showing an example of a tilt characteristic of a component coinciding with a pilot symbol in the case of changing the number of pilot symbols used in correlation processing.

In the correlated data accumulated and stored on the correlation result accumulation circuit 5, pilot symbols exist corresponding to the stored data amount. Data patterns of all pilot symbols are same. By performing correlation processing to a plurality of pilot symbols and integrating the accumulated correlated data, it is possible to prevent deterioration in estimation performance due to noises. In this case, however, the extracted tilt of the correlated signal T having the characteristic property changes depending on the number of pilot symbols used as shown in FIG. 17. Note that Rep in FIG. 17 indicates the number of pilot symbols used in correlation processing.

Figure 16:
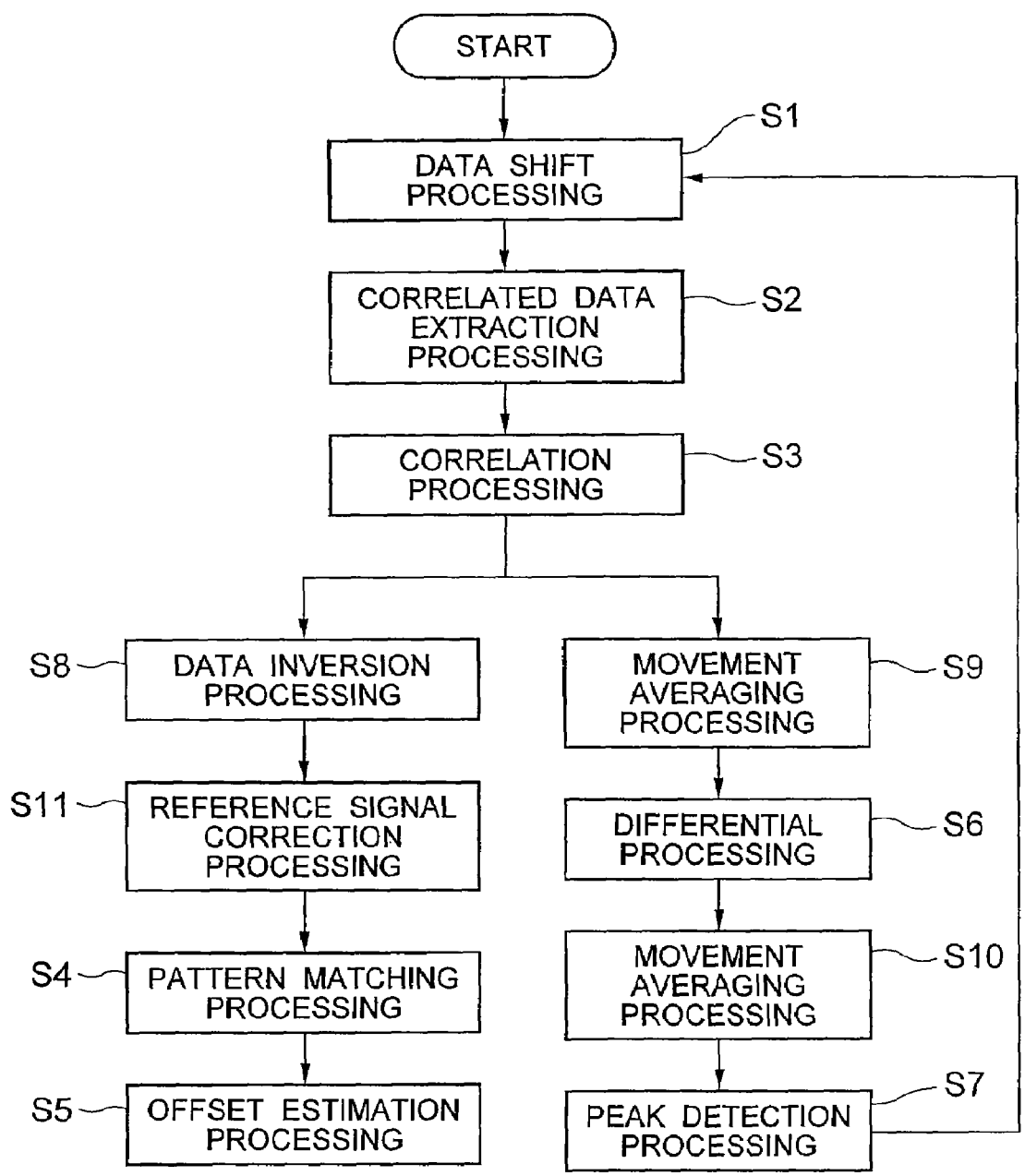
FIG. 16 is a flowchart showing the operation of the device for detecting a communication frame base point through blind processing, for each processing step, according to the fourth embodiment of the present invention.

In the fourth embodiment, when the processing proceeds to the reference signal correction processing step S11 in FIG. 16, the posture (tilt) of the reference signal 18 is corrected corresponding to the number of pilot symbols used in the processing by the reference signal correction circuit 13, to thereby suppress deterioration in estimation processing caused by disturbance.

According to the fourth embodiment, there is an advantage that deterioration in estimation processing caused by disturbance can be suppressed by correcting the posture (tilt) of the reference signal 18.

Fifth Embodiment

Next, a fifth embodiment, in which a synchronization processing function with respect to the demodulation system for demodulating a reception baseband signal is added to the configuration in FIG. 15 showing the fourth embodiment, will be described based on FIG. 18.

Figure 18:
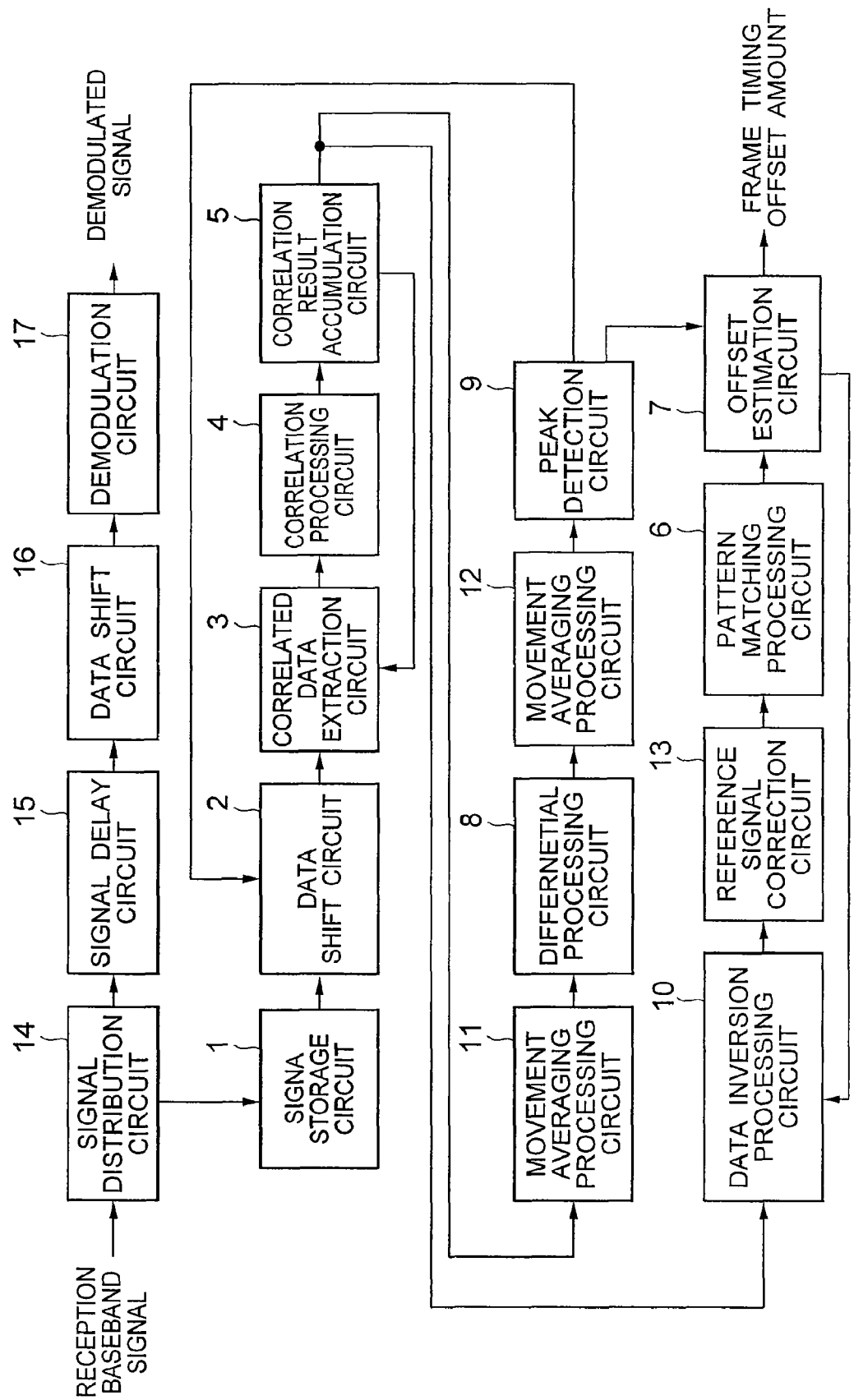
FIG. 18 is a block diagram showing the configuration of a device for detecting a communication frame base point through blind processing according to a fifth embodiment of the present invention.

As shown in FIG. 18, the fifth embodiment includes a data shift circuit 16 and a modulation circuit 17 as a demodulation system for demodulating a reception baseband signal. Further, it also includes a signal distribution circuit 14 for distributing the reception baseband signal to a signal delay circuit 15 and the signal storage circuit 1, and the signal delay circuit 15 in the front stage of the data shift circuit 16 of the demodulation system. Further, in FIG. 18, the signal storage circuit 1 through the reference signal correction circuit 13 form a processing system for estimating the base point of the pilot symbol, the offset amount of the reception baseband signal with respect to the base point, and the pattern length of the pilot symbol. Thereby, the signal delay circuit 15 constitutes a synchronization unit for synchronizing the processing system and the demodulation system for demodulating the reception baseband signals.

Figure 19:
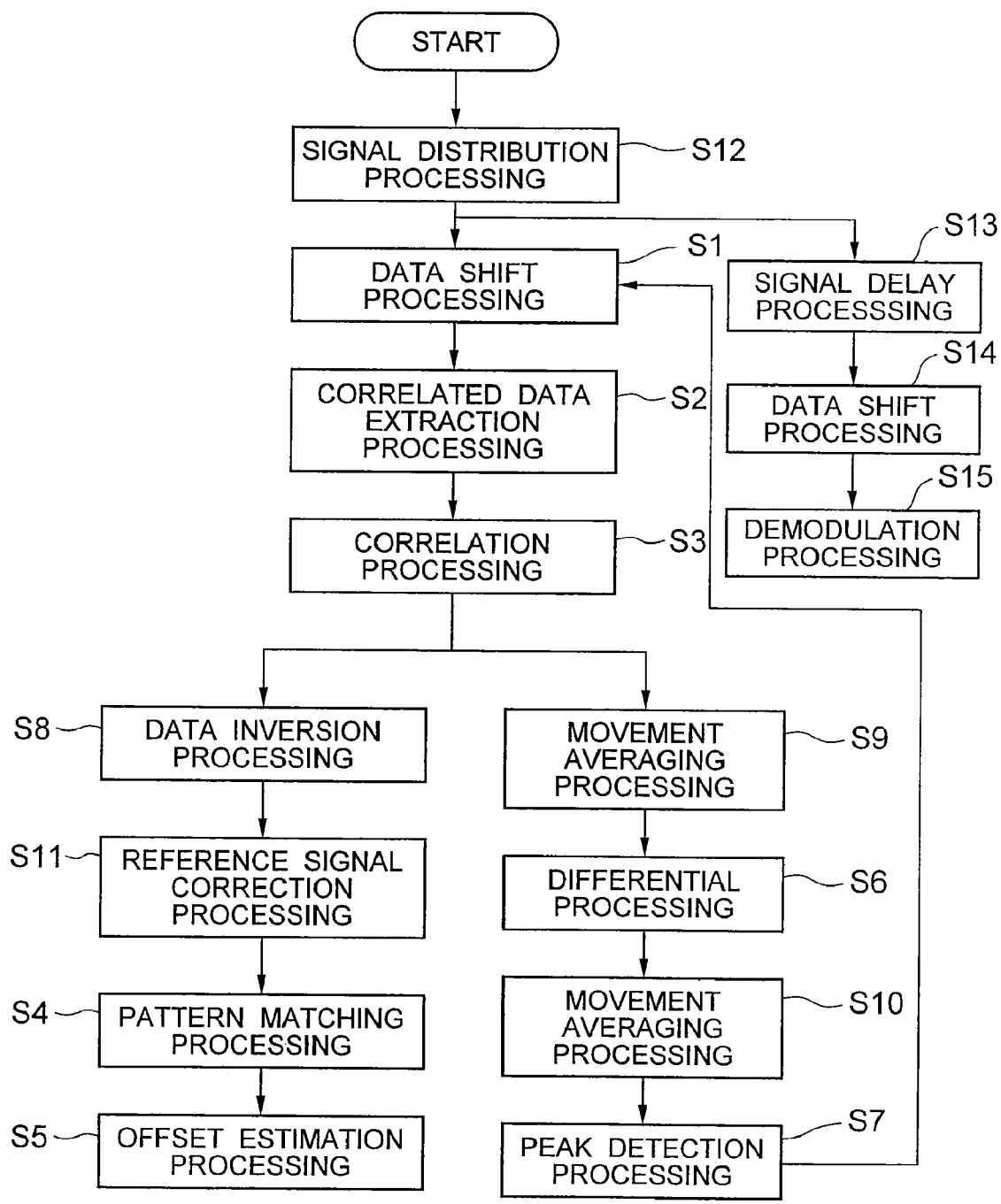
FIG. 19 is a flowchart showing the operation of the device for detecting a communication frame base point through blind processing, for each processing step, according to the fifth embodiment.
Figure 20:
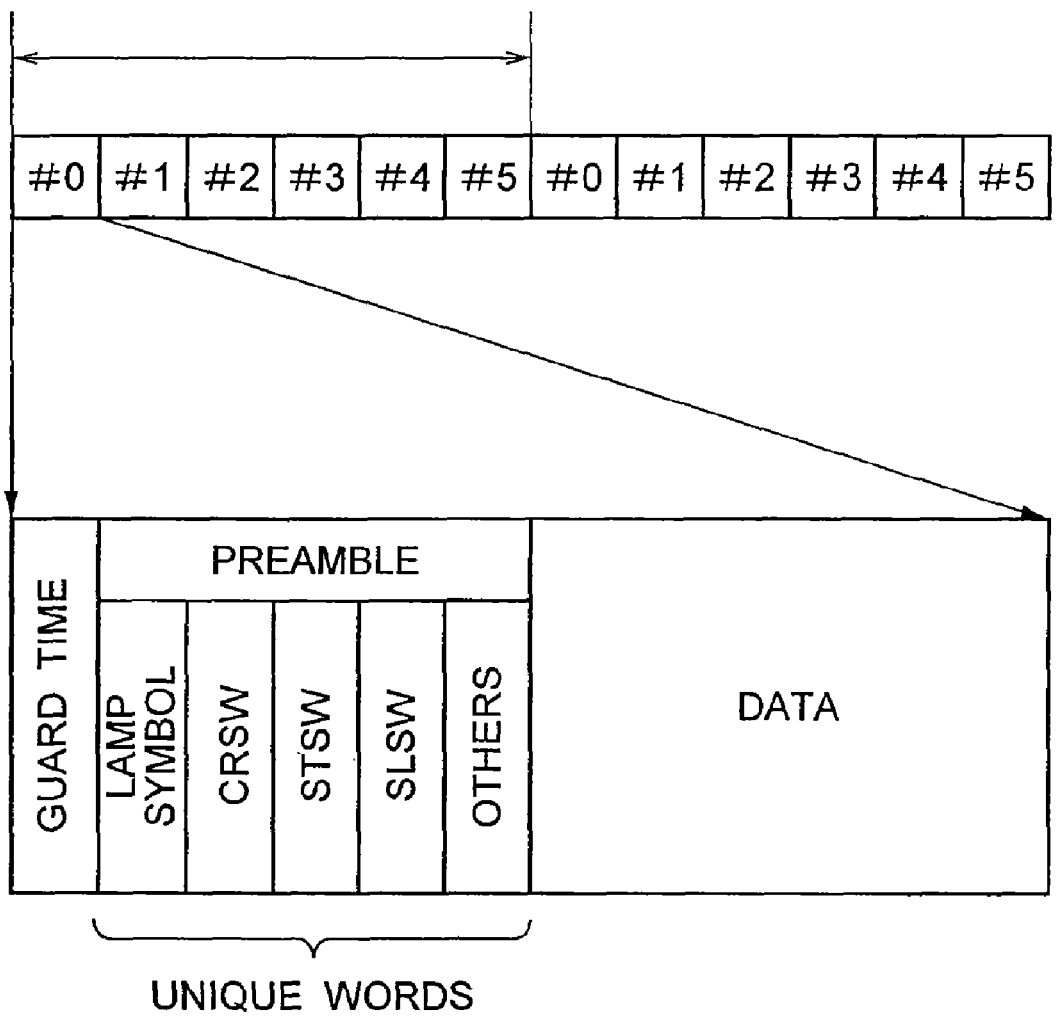
FIG. 20 is a diagram showing an example of a TDMA frame configuration.

Note that the data shift processing step S1, the data extraction processing step S2, the correlation processing step S3, the pattern matching processing step S4, the differential processing step S6, the peak detection processing step S7, the data inversion processing step S8, the movement averaging processing steps S9 and S10 and the reference signal correction processing step S11, shown in FIG. 19, are performed in the same manner as the processing shown in FIG. 16.

In the signal distribution processing step S12 shown in FIG. 19, a reception baseband signal is distributed to the signal delay circuit 15 and the signal storage circuit 1 by the signal distribution circuit 14. When the processing proceeds to the signal delay processing step S13, the signal delay circuit 15 delays the processing time of the demodulation system by a time required for the processing of the processing system, and causes the processing by the processing system to be performed while giving priority temporally.

When the processing of the processing system is completed within the time delayed by the signal delay circuit 15, information about the base point 10a of the pilot symbol 19a, the offset amount of the reception baseband signal with respect to the base point 10a, and the pattern length of the pilot symbol, is outputted from the offset estimation circuit 7 to the data shift circuit 16.

When the delay time set in the signal delay processing step S13 is elapsed, the processing proceeds to the data shift processing step S14. The data shift circuit 16 shifts the receiving point of the reception baseband signal based on the receiving point of the reception baseband signal and the data shift amount of the base point 10a of the pilot symbol 19a, estimated by the processing system. Thereby, the synchronization processing of the communication frame is completed.

When the processing proceeds to the demodulation processing step S15, the demodulation circuit 17 performs demodulation processing to the reception baseband signal in which synchronization of pilot symbols is completed.

According to the fifth embodiment, there is an advantage that frame synchronization processing can be performed and demodulation processing to reception signals can be realized, without knowing the pattern of the pilot symbol in advance.

As shown in FIGS. 1, 8, 12, 15 and 18, the embodiments of the present invention are configured as devices for detecting communication frame base point through blind processing. However, the present invention is not limited to these configurations. The present invention may be configured as a program for causing the series of processing shown by the flowcharts shown in FIGS. 2, 9, 13, 16 and 19 to be performed by a computer constituting a device for detecting a communication frame base point through blind processing.

In this case, the program for the device for detecting a communication frame base point through blind processing according to the embodiment of the present invention causes the computer to perform functions by the circuit configurations shown in FIGS. 1, 8, 12, 15 and 18. More specifically, the program for the device for detecting a communication frame base point through blind processing according to the embodiment of the present invention is so configured as to cause a computer constituting the device for detecting a communication frame based point through blind processing to perform: a function of extracting self correlation processing signals from a digital communication signal having a signal frame for synchronization by using a pair of correlation processing windows of a variable size; a function of performing self correlation processing to the self correlation processing signals extracted; a function of performing pattern matching processing between the correlation processed signal, which is self correlation-processed, and a reference signal; a function of estimating the base point of the signal frame and offset of the digital communication signal with respect to the base point, based on the distance information of the pattern matching processing.

Further, as shown in FIG. 2, the present invention is so configured as to cause the computer to perform: a function of performing differential detection processing and peak base point detection processing to the self-correlation-processed signal processed by the correlation unit and estimating the shift amount for data-shifting the digital communication signal; and a function of data-shifting the digital communication signal based on the shift amount estimated by the complementation unit.

Further, as shown in FIG. 9, the present invention is so configured as to cause the computer to perform: a function of performing data inversion processing to the correlated data which was self correlation processed by the correlation unit to thereby expose factors to specify the pattern length of the signal pattern; and a function of estimating the pattern length based on the exposed factors.

Further, as shown in FIG. 13, the present invention is so configured as to cause the computer to perform a function of suppressing disturbance components included in the correlated data handled by the complementation unit. Further, as shown in FIG. 16, the present invention is so configured as to cause the computer to perform a function of correcting the posture of the reference signal with respect to the correlation processing signal.

Further, as shown in FIG. 19, the present invention is so configured as to cause the computer to perform a function of synchronizing the processing system for estimating the base point of the signal frame and offset of the digital communication signal with respect to the base point, with the demodulation system for demodulating the digital communication signal.

In the description above, changes such as distribution and exchange of before and after of the procedures by separation and combination for the embodiments can be done freely provided that the functions described above are satisfied, so the present invention is not limited to the embodiments described above.

INDUSTRIAL APPLICABILITY

As described above, according to the present invention, by utilizing a characteristic that communication frames having symbols for synchronization are inserted periodically into a digital communication signal, self correlation processing signals are extracted from the digital communication signal in correlation processing windows of a variable size, and through pattern matching processing between the correlated signal obtained by correlation-processing the self correlated signals and the reference signal, communication parameters (base point of pilot symbol, etc.) are estimated. Therefore, it is possible to estimate communication parameters from a received digital communication signal, without obtaining information about a known synchronization symbol in advance. Further, by performing differential detection processing, it is possible to estimate communication parameters from the received digital communication signal irrespective of a receiving point for receiving the digital communication signal.

What is claimed is:

1. A device for detecting a communication frame base point through blind processing, comprising:
   an extraction circuit for extracting self correlation processing signals from a digital communication signal having a signal frame for synchronization by using a pair of correlation processing windows of a variable size;
   a correlation unit for performing self correlation processing to the self correlation processing signals extracted;
   a matching unit for performing pattern matching processing between a correlation-processed signal, obtained through the self correlation processing, and a reference signal;

a computation unit for estimating a base point of the signal frame and an offset of the digital communication signal with respect to the base point, based on distance information of the pattern matching processing; and an inversion unit for performing data inversion processing to correlated data, self-correlation-processed by the correlation unit, to thereby expose a factor identifying a pattern length of a signal pattern, wherein the computation unit has a function of estimating the pattern length based on the factor exposed.

2. A device for detecting a communication frame base point through blind processing, comprising:

an extraction circuit for extracting self correlation processing signals from a digital communication signal having a signal frame for synchronization by using a pair of correlation processing windows of a variable size;

a correlation unit for performing self correlation processing to the self correlation processing signals extracted;

a matching unit for performing pattern matching processing between a correlation-processed signal, obtained through the self correlation processing, and a reference signal;

a computation unit for estimating a base point of the signal frame and an offset of the digital communication signal with respect to the base point, based on distance information of the pattern matching processing;

a complementation unit for performing differential detection processing and peak base point detection processing to the self-correlation-processed signal, processed by the correlation unit, to thereby estimate a shift amount for data-shifting the digital communication signal;

a shift unit for data-shifting the digital communication signal based on the shift amount estimated by the complementation unit; and a suppression unit for suppressing a disturbance component included in the correlated data handled by the complementation unit.

3. A method of detecting a communication frame base point through blind processing, comprising:

an extraction step to extract self correlation processing signals from a digital communication signal having a signal frame for synchronization by using a pair of correlation processing windows while changing a window size;

a correlation step to perform self correlation processing of the self correlation processing signals extracted;

a matching step to perform pattern matching processing between a correlation-processed signal, obtained through the self correlation processing, and a reference signal;

a computation step to estimate a base point of the signal frame and an offset of the digital communication signal with respect to the base point, based on distance information of the pattern matching processing;

an inversion step to perform inversion processing to correlated data, self-correlation- Processed by a correlation unit, to thereby expose a factor identifying a pattern length of a signal pattern; and a step to estimate the pattern length based on the factor exposed.

4. A method of detecting a communication frame base point through blind processing, comprising:

an extraction step to extract self correlation processing signals from a digital communication signal having a signal frame for synchronization by using a pair of correlation processing windows while changing a window size;

a correlation step to perform self correlation processing of the self correlation processing signals extracted;

a matching step to perform pattern matching processing between a correlation-processed signal, obtained through the self correlation processing, and a reference signal;

a computation step to estimate a base point of the signal frame and an offset of the digital communication signal with respect to the base point, based on distance information of the pattern matching processing;

a complementation step to perform differential detection processing and peak base point detection processing to the self correlation-processed signal, processed by a correlation unit, to thereby estimate a shift amount for data-shifting the digital communication signal;

a shift step to data-shift the digital communication signal based on the shift amount estimated by a complementation unit; and a suppression step to suppress a disturbance component included in correlated data handled by the complementation unit.

* * * * *